(12) United States Patent
Loughry

(10) Patent No.: US 6,987,461 B2
(45) Date of Patent: Jan. 17, 2006

(54) SYSTEM AND METHOD FOR ADDRESSING OPTICAL EMANATIONS FROM AN INFORMATION PROCESSING DEVICE

(75) Inventor: Robert Joseph Loughry, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 514 days.

(21) Appl. No.: 10/074,648

(22) Filed: Feb. 12, 2002

(65) Prior Publication Data

US 2002/0152041 A1    Oct. 17, 2002

Related U.S. Application Data

(60) Provisional application No. 60/270,916, filed on Feb. 13, 2001.

(51) Int. Cl.
*G08B 5/00* (2006.01)

(52) U.S. Cl. .............................. 340/815.4; 340/815.5; 340/815.57; 345/629

(58) Field of Classification Search ............ 340/815.4, 340/815.5, 815.57, 654; 345/629, 473, 204; 702/57, 108; 713/200, 201; 359/242
See application file for complete search history.

(56) References Cited

U.S. PATENT DOCUMENTS 5,473,110 A    12/1995   Johnson ................. 174/35 GC
5,598,566 A *  1/1997   Pascucci et al. ............ 713/324
6,126,454 A    10/2000  Flegeo ......................... 439/67
6,198,403 B1 * 3/2001   Dorrough et al. ........... 340/635

OTHER PUBLICATIONS

EDN Design Ideas, Paul Johnson, "Circuit Adapts Signals for Visual Perception," p. 104, Oct. 12, 1995.
Avon Books, Inc., Neal Stephenson, *Cryptonomicon*, pp. 825-827, May 1999, New York, NY.

* cited by examiner

Primary Examiner—Phung T. Nguyen

(74) *Attorney, Agent, or Firm*—Marsh Fischmann & Breyfogle LLP

(57) ABSTRACT

Various methods are disclosed relating to optical emanations from a light source or a first optical device that is intended to display a state of a serial data stream that crosses an interface that is associated with an information processing device. In one embodiment, the first optical device is modulated in a manner so as to not replicate the data signal being provided to and/or transmitted from the information processing device. In another embodiment, the optical emanations from the first optical device are monitored so as to be able to recover the data that is being transmitted to the information processing device in the form of a first data signal. In yet another embodiment, the cumulative optical output of a plurality of first optical devices associated with a plurality of information processing devices is monitored and evaluated in the form of a cumulative signal so as to decode each of the various individual data signals.

50 Claims, 20 Drawing Sheets

| CHARACTER | IN BINARY | (REVERSE THE BITS) | REVERSED AND FRAMED BY START/STOP BITS |
|---|---|---|---|
| p | 01010000 | 00001010 | 0000011101 |
| a | 01100001 | 10000110 | 0100001101 |
| s | 01110011 | 11001110 | 0110011101 |
| s | 01110011 | 11001110 | 0110011101 |
| w | 01110111 | 11101110 | 0111011101 |
| o | 01101111 | 11110110 | 0111101101 |
| r | 01110010 | 01001110 | 0010011101 |
| d | 01100100 | 00100110 | 0001001101 |
| <RETURN> | 00001011 | 11010000 | 0110100001 |

# SYSTEM AND METHOD FOR ADDRESSING OPTICAL EMANATIONS FROM AN INFORMATION PROCESSING DEVICE

CROSS-REFERENCE TO RELATED APPLICATIONS

This patent application is a utility patent application that is based upon and claims priority from U.S. Patent Application Ser. No. 60/270,916 filed on Feb. 13, 2001, and entitled "INFORMATION LEAKAGE FROM OPTICAL EMANATIONS", the entire disclosure of which is incorporated by reference in its entirety herein.

STATEMENTS REGARDING FEDERALLY SPONSORED RESEARCH OR DEVELOPMENT

Not applicable.

FIELD OF THE INVENTION

The present invention generally relates to the field of information processing devices and, more particularly, to addressing optical emanations from an optical device that is associated with the information processing device. This purpose of this optical device is to display a state of a serial data stream that crosses an interface that is associated with the information processing device.

BACKGROUND OF THE INVENTION

Radio frequency (RF) emanations from computers and video displays have been previously identified as potentially compromising emanations. That is, at least certain RF emanations have been discovered to be indicative of the data being transmitted, processed, displayed or otherwise associated with the corresponding device. Steps have been taken to address these RF emanations in order to protect the corresponding data. This has typically involved the use of various types of shielding techniques.

Various types of what may be characterized as information processing devices exist, such as data communication equipment, data encryption devices, modems, routers, line drivers, data loggers, computers, various types of data storage devices, data input/output devices, and printer sharing devices. At least some of these information processing devices may emit compromising RF signals. Many of these types of devices also utilize at least one light source for purposes of displaying a state of a serial data stream that crosses an interface of the particular information processing device. In at least certain situations this light source is modulated in accordance with the data signal that is being received by and/or transmitted from the associated information processing device.

BRIEF SUMMARY OF THE INVENTION

The present invention generally relates to optical emanations from a first optical device that is associated with an information processing device. This first optical device is provided for purposes of displaying a state of a serial data stream that crosses an interface that is associated with the information processing device. Representative optical devices include without limitation a light emitting diode, a liquid crystal display, incandescent, fluorescent, or gas discharge lamps, an electroluminiscent display, and a cathode ray tube. Generally, the first optical device must be sufficiently responsive or fast enough so as to be able to at least generally reproduce the timing of bit transitions in a serial, binary data signal that is being received by and/or being transmitted from the information processing device for one or more aspects of the present invention. Representative information processing devices include without limitation data communication equipment, data encryption devices, modems, routers, line drivers, data loggers, computers, various types of data storage devices, data input/output devices, and printer sharing devices.

A first aspect of the present invention is embodied in a method for operating the above-noted type of first optical device. The method includes providing a first data signal to the information processing device. In the case of the first aspect, the first optical device is operated other than in accordance with this first data signal.

Various refinements exist of the features noted in relation to the first aspect of the present invention. Further features may also be incorporated in the first aspect of the present invention as well. These refinements and additional features may exist individually or in any combination. Generally, the present invention encompasses operating the first optical device in a manner so that its optical emanations do not replicate the first data signal. This may be done in any number of manners. For instance, the first aspect may further include directing the first data signal toward the first optical device. In order to at least reduce the potential for operating the first optical device in accordance with the first data signal, the transmission of the first data signal to the first optical device may be totally blocked. Representative ways in which the transmission of the first data signal to the first optical device may be blocked include activating a switch that is disposed within an electrical path along which the first data signal is being transmitted toward the first optical device, removing a jumper that is disposed within this electrical path, controlling one or more of the inputs of an AND-gate that is disposed within this electrical path, or any combination thereof. Another option for controlling the operation of the first optical device is through a microprocessor that is programmed in a manner such that the first optical device is modulated in a manner that is not indicative of the data within the data signal being received by and/or transmitted from the information processing device. Yet another option is to provide a constant logic level signal to the first optical device to maintain its optical output at least at substantially a constant level. This may be done by controlling one or more inputs to an OR-gate that may be disposed within the electrical path along which the first data signal is being transmitted toward the first optical device.

The method that is embodied by the first aspect of the present invention may include directing the first data signal at least toward the first optical device as noted (that is, it does not necessarily reach the first optical device, such that the first optical device is not modulated in a manner that reproduces the data stream in the first data signal). This first data signal may be changed in at least one respect to define a second signal that is then provided to the first optical device. At least some of the data from the first data signal is removed from the first data signal in the changing of the first data signal to the second signal for provision to the first optical device. One way in which the first data signal may be changed is to filter the first data signal. This filtering may include using a low-pass filter. This change of the first data signal may be such that a time duration for any bit in the second signal is at least 1.5 times greater than in one embodiment, and at least 2 times greater than in another embodiment, a time duration of any bit in the first data signal. Another way to characterize this filtering is that pulse widths (defined by one or more bits) of less than a certain amount are not allowed to proceed to the first optical device—only those of at least a certain pulse width are allowed to proceed to the first optical device to control the operation thereof. Therefore, at least some of the data from the first data signal will not be retrievable from the optical output of the first optical device.

Another option for changing the first data signal into the second signal in accordance with the first aspect is for this change to be such that the "on time" for the first optical device (when it is emitting light) when operated in accordance with the second signal is at least 1.5 times greater than a unit interval of at least one of a current data rate or a slowest data rate that is associated with the first data signal. The "unit interval" is the time that is required to transmit one bit, and is the inverse of the corresponding data rate. Yet another option is for the noted change to be such that such that the "off time" for the first optical device (when it is not emitting light) when operated in accordance with the second data signal is at least 1.5 times greater than the unit interval of at least one of the current data rate or the slowest data rate that is associated with the first data signal, or both. In one embodiment, both the "on time" and the "off time" of the first optical device are controlled in the above-noted manners.

A second aspect of the present invention is embodied in a method for operating the above-noted type of first optical device. The method includes providing a first data signal to the information processing device. This first data signal is changed in at least one respect to define a second signal that is then provided to the first optical device. At least some of the data from the first data signal is removed from the first data signal in the changing of the first data signal to the second signal. The first optical device is then operated in accordance with this second signal.

Various refinements exist of the features noted in relation to the second aspect of the present invention. Further features may also be incorporated in the second aspect of the present invention as well. These refinements and additional features may exist individually or in any combination. One way in which the first data signal may be changed is to filter the first data signal. This filtering may include using a low-pass filter. This change of the first data signal may be such that a time duration for any bit in the second signal is at least 1.5 times greater than in one embodiment, and at least 2 times greater than in another embodiment, a time duration of any bit in the first data signal. Another way to characterize this filtering is that pulse widths (defined by one or more bits) of less than a certain amount are not allowed to proceed to the first optical device—only those of at least a certain pulse width are allowed to proceed to the first optical device to control the operation thereof.

Another option for changing the first optical signal into the second signal in accordance with the second aspect is for this change to be such that the "on time" for the first optical device (when it is emitting light) when operated in accordance with the second signal is at least 1.5 times greater than a unit interval of at least one of a current data rate or a slowest data rate that is associated with the first data signal. The "unit interval" again is the time that is required to transmit one bit. Yet another option is for the noted change to be such that such that the "off time" for the first optical device (when it is not emitting light) when operated in accordance with the second data signal is at least 1.5 times greater than the unit interval of at least one of the current data rate or the slowest data rate that is associated with the first data signal, or both. In one embodiment of the second aspect, both the "on time" and the "off time" of the first optical device are controlled in the above-noted manners.

A third aspect of the present invention is embodied by a method for obtaining data from an information processing device having a first optical device of the above-described type. A first data signal is provided to the information processing device, and the state of this first data signal as it crosses an interface that is associated with the information processing device is displayed by the first optical device. The optical output of the first optical device is monitored and is used to generate an optical output-based signal. Data from the first data signal is retrieved by decoding this optical output-based signal using an appropriate computer (for instance, using an appropriate decoding algorithm).

Various refinements exist of the features noted in relation to the third aspect of the present invention. Further features may also be incorporated in the third aspect of the present invention as well. These refinements and additional features may exist individually or in any combination. In one embodiment, the monitoring of the optical output is done at a remote location or such that the monitoring apparatus and the information processing device are at different locales. In any case, the analysis of the optical output-based signal will typically be done at a different location from that occupied by the information processing device. That is, the third aspect may be characterized as being directed to a third party monitoring the operation of an information processing device to retrieve data therefrom in a manner so as to not be detected by the owner or operator of this information processing device.

The optical output of the first optical device may be monitored using telescopic optics, directly by an optical sensor, or by any other way of conveying the optical output of the first optical device to an optical sensor. One way of retrieving the data from the first data signal through a monitoring of the optical output of the first optical device is to convert this optical output to an electrical signal, and to thereafter decode this electrical signal. Conversion of the optical output to an electrical signal may be accomplished by directing the optical output to one or more photodetectors, photomultipliers, phototransistors, photodiodes, or other optical-to-electrical converters. One way in which this electrical signal may be decoded is by processing the same using a universal synchronous-asynchronous receiver-transmitter. It may be necessary to amplify the signal, level-shift the signal, or filter the signal to remove noise therefrom, individually or in any combination, prior to being in appropriate form for decoding.

One may decode an optical output-based signal using a first decoding protocol of the third aspect. In this first decoding protocol of the third aspect, a second signal that corresponds with the optical output from the first optical device (the noted optical output-based signal) is analyzed to retrieve the data that is carried by or embodied in the first data signal. This second signal may be of any appropriate type, including the optical signal itself, an electrical signal that is the result of a conversion of the optical output of the first optical device in the above-noted manner, or an acoustic signal that is the result of an optical-to-acoustic converter (e.g., surface-acoustical wave filters, or a SAW device, which are a signal processing element that uses electrical-to-acoustical conversion in their operation). The analysis of the second signal generally entails identifying a start bit/start bit symbol candidate, a stop bit/stop bit symbol candidate, or both. "Candidate" in terms of a start or stop bit means that an assumption is being made that a certain bit in the second signal is a start bit or a stop bit. That is, typically one will not know for sure that a given bit is in fact a start bit or a stop bit until further analysis is completed. Although the start and stop bits each may be any appropriate symbol, in one embodiment the second signal is binary, each start bit in the second signal has a value of 0, each stop bit in the second signal has a value of 1, and each bit in a byte (the number of bits between a start and stop bit) also has a value of 0 or 1. In this embodiment, one would look for a transition from a 1 to a 0 in the second signal, and assume that this transition defined a start bit for purposes of the analysis (and thereby becomes a start bit candidate in accordance with the first decoding protocol of the third aspect). Although one would typically use the "earliest-in-time" transition from a 1 to a 0 as the start bit candidate to initiate the first decoding protocol of the third aspect, any subsequent transition from a 1 to a 0 could be selected as the initial start bit candidate. The remainder of the first decoding protocol of the third aspect will be described in relation to the embodiment where the second signal is binary, where start bits have a logic level of 0, and where stop bits have a logic level of 1. However, the first decoding protocol of the third aspect is equally applicable to other embodiments, including where all start bits are of one value and where all stop bits are of a different value.

Analysis of the second signal in accordance with the first decoding protocol of the third aspect may also undertaken to identify its unit interval in the case of the third aspect. The unit interval of a data or data-related signal again is the time that is required to transfer one bit. Therefore, the unit interval should correspond with the smallest pulse width in the second signal. The timing of identifying the start or stop bit candidate and identifying the unit interval is not of particular significance (i.e., they may be done in either order). There may be instances where the unit interval is otherwise known. Any way of identifying the unit interval for purposes of the first decoding protocol of the third aspect may be utilized.

Once the unit interval of the second signal has been determined in accordance with the first decoding protocol of the third aspect, the accuracy of the above-noted assumption regarding the selection of the start and/or stop bit candidate may be undertaken. There are a limited number of data signal formats that are typically utilized in relation to how many data bits are contained in each byte or character (between corresponding pairs of start and stop bits). Most binary, serial data signals typically either use seven bit bytes or eight bit bytes. Unless the number of bits per byte is known for the second signal, one will also need to assume the number of bits in each byte that is contained in the second signal for purposes of the first decoding protocol of the third aspect.

Assuming that a start bit candidate was identified for purposes of the analysis in accordance with the first decoding protocol of the third aspect, if both this and the bits/byte assumptions are correct, one should see a stop bit "N+1" unit intervals after the start bit candidate, where "N" is the number of bits/byte (either known or assumed). In the case where the start bits have a logic level of 0 and where the stop bits have a logic value of 1, one should thereby see a logic level of 1 "N+1" unit intervals after the start bit candidate. Seeing a logic level of 1 at this time of course does not guarantee that both assumptions were indeed correct, but only increases the likelihood of the validity of the assumptions. That is, the second signal should continue to be decoded in the above-noted manner for the next-in-time start bit candidate. It should be appreciated that a channel may remain idle for any number of unit intervals between each byte or character. However, the next transition to a logic level of 0 should thereby be a start bit for the next byte or character. The second signal may be decoded in this manner so long as the validity of both assumptions remains accurate.

In the event that one does not see a stop bit "N+1" unit intervals after the start bit candidate or any next-in-time start bit (where "N" again is the number of bits/byte (either known or assumed) for purposes of the second decoding protocol of the third aspect, either the initial assumption regarding the start bit candidate was inaccurate or the number of bits/byte that was assumed is inaccurate. That is and for the case where the start bits have a logic level of 0 and where the stop bits have a logic level of 1, one or both of the noted assumptions are incorrect if one does not see a logic level of 1 "N+1" unit intervals after the start bit candidate. There are a number of ways in which this may be handled. One could select a new start bit candidate in the second signal, assume a different number of bits per byte for the second signal, or both, and repeat the first decoding protocol of the third aspect as described until the entirety of the second signal is decodable with the then current assumptions. In one embodiment, the current assumption on the number of bits/byte is retained, a new start bit candidate is selected, and the first decoding protocol of the third aspect as described is repeated. This portion of the protocol may be repeated any number of times if the entirety of the second signal may not be decoded using the current assumptions. In another embodiment, the current assumption regarding the start bit candidate is retained, a new number of bits/byte is assumed, and the first decoding protocol of the third aspect as described is repeated. This may be done any number of times if the entirety of the second signal may be not be decoded using the current assumptions. However, in this instance it would typically only be repeated for the more common bits/byte data signal formats.

A fourth aspect of the present invention is embodied by a method for obtaining data from a plurality of information processing devices, each of which has a first optical device of the above-described type. A data signal is provided to each of the information processing devices, and the state of this data signal as it crosses an interface that is associated with a given information processing device is displayed by its corresponding first optical device. The unit interval of each of these data signals is the same, no two data signals begin at precisely the same time, and the format of each data signal is the same (i.e., the same logic level for each start bit, the same logic level for each stop bit, and the same number of bits per byte). The cumulative optical output of the first optical devices is monitored. Each of the individual data signals is decoded by analyzing a single second signal that is representative of the time rate of change of the noted cumulative optical output of the various first optical devices (e.g., an optical output-based signal).

Various refinements exist of the features noted in relation to the fourth aspect of the present invention. Further features may also be incorporated in the fourth aspect of the present invention as well. These refinements and additional features may exist individually or in any combination. The second signal may be of any appropriate type, including the cumulative optical output itself, an electrical signal that is the result of a conversion of the cumulative optical output of the first optical device, or an acoustic signal that is the result of an optical-to-acoustic converter. Various options for identifying each of the individual optical signals may be utilized and then decoding the same. Generally, both the second and third decoding protocols that will be discussed in relation to the fourth aspect require that data signal format data be entered. This data signal format data will typically include at least the unit interval (that is again the same for each of the individual data signals) and the number of bits per byte (that is again the same for each of the individual data signals). Other data may be required as well, such as the logic level for start bits and the logic level for stop bits.

A second decoding protocol that may be utilized by the fourth aspect attempts to identify multiple data signals in a single progression through or analysis of the second signal. Generally this requires scanning or reviewing the second signal to identify a first transition and assigning or associating this first transition to/with a first data signal candidate. This first data signal candidate is assumed to be associated with a first information processing device. Although this first transition is preferably the first-in-time transition in the second signal, such need not be the case. For ease of reference, this first transition may be renamed as the "current transition."

Each transition that exists in the second signal between the time of the current transition and one unit interval thereafter is assigned to or associated with its own data signal candidate. For instance and for each of the transitions that exist within this first unit interval after the current transition, the first transition that is identified after the current transition may be assigned to or associated with second data signal candidate, the second transition that is identified after the current transition may be assigned to or associated with a third data signal candidate, the third transition that is identified after the current transition may be assigned to or associated with a fourth data signal candidate, and so forth. After all of the transitions have been identified in the first unit interval after the current transition, the second signal thereafter continues to be scanned to determine if there are any transitions at the expected times (based upon the known/assumed unit interval) for the individual data signal candidates thus far identified. Assuming that these transitions do exist, any other transition that is encountered other than at times that should be associated with existing data signal candidates is assigned to its own data signal candidate. Once all of the data signal candidates have been identified in this manner from the second signal, they may be decoded in any appropriate manner, such utilizing the first decoding protocol of the third aspect.

The first decoding protocol that may be associated with the fourth aspect may require reentry of at least some of the data signal format data. For instance, in the event that there are no transitions in the second signal at any integer multiple of the unit interval after any of the transitions that have already been assigned to a data signal, the unit interval that was entered is likely incorrect. Therefore, a new unit interval may need to be entered for repetition of the above described second decoding protocol of the fourth aspect.

A third decoding protocol that may be utilized by the fourth aspect in effect sequentially parses out each of the various individual data signals from the second signal (the combined optical output-based signal). That is, a first data signal is identified in the second signal in a manner discussed in more detail below, and this first data signal is then in effect subtracted from the second signal. The components of this first data signal may actually be removed from the second signal, but more likely its components will be assigned or associated with the first data signal so as to not be available for being part of any other data signal in the second signal. This third decoding protocol on the fourth aspect will obviously require multiple passes through the second signal in order to complete the analysis of the same for purposes of identifying and thereafter decoding the various individual data signals.

The third decoding protocol that may be utilized by the fourth aspect includes entering the above-noted data signal format data. The second signal is scanned to identify or otherwise select an unassigned transition. Typically this will be the first-in-time transition in the second signal, although such need not be the case. This first unassigned transition may be set equal to a base transition for ease of reference. The second signal is scanned to determine if there is any other transition at any integer multiple of the unit interval from the base transition. That is, if the unit interval information that has been entered is correct, one should see additional transitions in the second signal, and at least some of these transitions should be located in the second signal at times that are a unit interval integer multiple in relation to the base transition. Consider the case where the unit interval has been assumed to be 104.2 microseconds (corresponding with a data transmission rate of 9,600 bits per second), and where the base transition corresponds with a time $t_0$. The first unit interval integer multiple will then be $t_1$ (104.2 microseconds after $t_0$), the second unit interval integer multiple will then be $t_2$ (104.2 microseconds after $t_1$), the third unit interval integer multiple will then be $t_3$ (104.2 microseconds after $t_2$), and so forth. If no such transitions exist at one or more of these times, a different unit interval should be entered and the third decoding protocol as thus far described should be repeated.

When the third decoding protocol of the fourth aspect identifies a base transition in the second signal, and where there are additional transitions that are spaced at integer multiples of the unit interval from the time of the base transition, the logic level or value at the time of the base transition and at the time of each integer multiple of the unit interval is determined and recorded as desired in association with a particular signal. For instance, the first signal that is recovered in this manner may be characterized as a first recovered signal or the like. Thereafter, the particular recovered signal may be decoded in any appropriate manner. For instance, the first decoding protocol of the third aspect may be utilized.

Once a particular signal has been identified or recovered in the above-noted manner, the second signal is re-scanned to determine if there are any additional unassigned transitions. Any such unassigned transition may be set equal to the base transition, and the third decoding protocol may be repeated for this new base transition. Once there are no longer any unassigned transitions, all of the data signals will have been identified or recover, and the third decoding protocol of the fourth aspect may exit.

DETAILED DESCRIPTION OF THE INVENTION

Figure 1A:
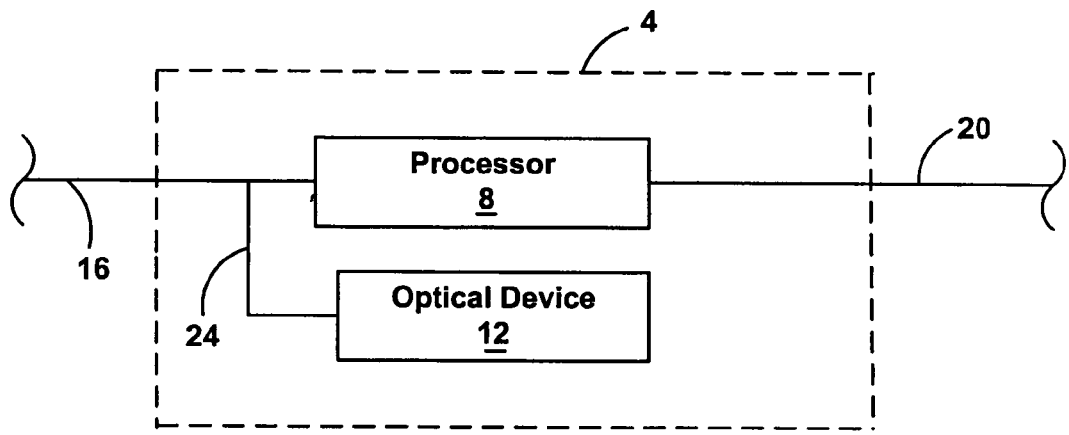
FIG. 1A illustrates one embodiment of a prior art information processing device.

The present invention will now be described in relation to the accompanying drawings that at least assist in illustrating its various pertinent features. FIG. 1A schematically presents one embodiment of a prior art information processing device 4. Representative types for the information processing device 4 include without limitation various types of data communication equipment, data encryption devices, modems, routers, line drivers, data loggers, and printer sharing devices. This information processing device 4 generally includes a processor 8 of some sort and an optical device 12 that is provided for purposes of displaying the state of a serial data stream that is being provided to the processor 8 through a data input line 16. Representative types for the optical device 12 include a light emitting diode, a liquid crystal display, incandescent, fluorescent, or gas discharge lamps, an electroluminiscent display, and a cathode ray tube,. In any case, a data monitoring line 24 extends from the data input line 16 to the optical device 12. The information processing device 4 may also includes a data output line 20. It should be appreciated that the data monitoring line 24 could extend from the data output line 20 to the optical device 12 to display the state of a serial data stream that is being transmitted from the processor 8 (not shown). It should also be appreciated that there may be instances where there is only one data line for the information processing device 4.

Figure 1B:
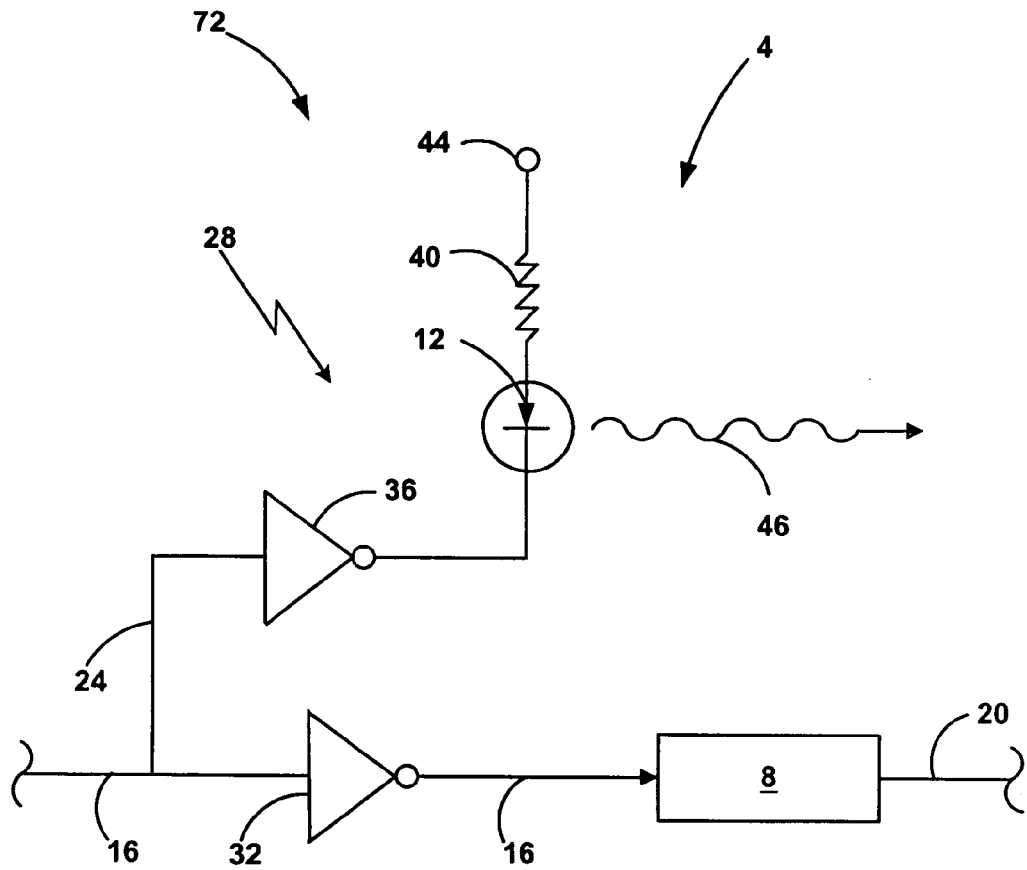
FIG. 1B illustrates one embodiment of a prior art RS-232 monitoring circuit that may be used by the information processing device of FIG. 1A.
Figure 2B:
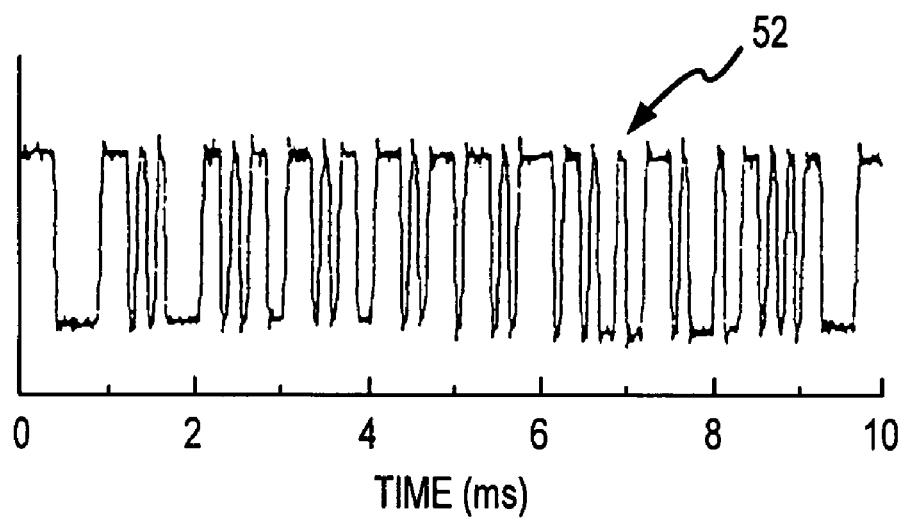
FIG. 2B illustrates a trace or waveform of a signal that is associated with an optical output from an optical device utilized by the information processing device of FIG. 1A, while the information processing device of FIG. 1A is receiving or transmitting the data signal of FIG. 2A.
Figure 2A:
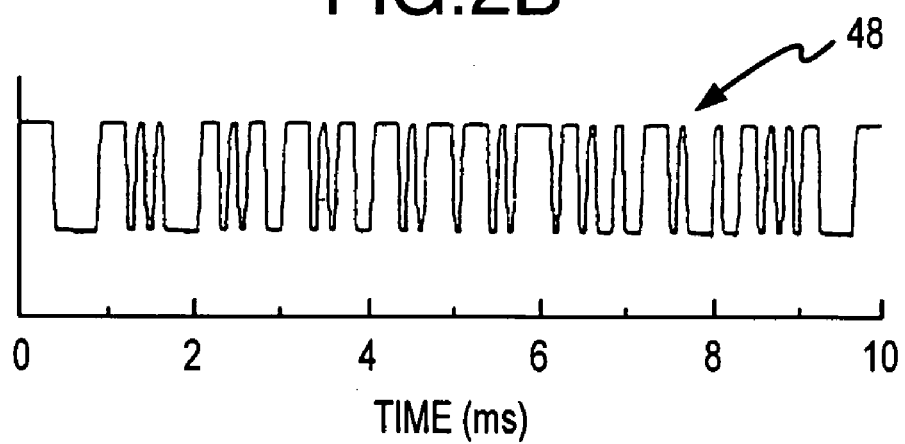
FIG. 2A illustrates a trace or waveform of one embodiment of a data signal that may be provided to the information processing device of FIG. 1A.

One embodiment of a data signal monitoring circuit 28 is illustrated in FIG. 1B and that may be utilized by the information processing device 4 of FIG. 1A. Data that is being transmitted through the data input line 16 is typically directed to an appropriate data signal driver 32 (e.g., an amplifier, such as RS-232 driver) before being provided to the processor 8. The data monitoring line 24 extends from the data input line 16 upstream of the data signal driver 32. The data signal monitoring circuit 28 include the data monitoring line 24, as well as an optical device driver 36 (e.g., an amplifier), a current limiting resistor 40, and a voltage source 44 that are each electrically interconnected within the data monitoring line 24. The optical device 12 is disposed in the data monitoring line 24 between the current limiting resistor 40 and the optical device driver 36. A serial data signal in binary form that is being transmitted to the processor 8 is thereby also directed through the data monitoring line 24 and to the optical device 12 in a manner so as to provide an optical output 46. One embodiment of a serial data signal in binary form that may be transmitted to the processor 8 through the data input line 16 is represented by a data waveform 48 that is presented in FIG. 2A. A corresponding optical output waveform 52 of the optical output 46 by the optical device 12 is presented in FIG. 2B. There is a high correlation between the data waveform 48 of FIG. 2A and the optical output waveform 52 of FIG. 2B. The discovery of the existence of this high correlation is utilized by the present invention.

Figure 3:
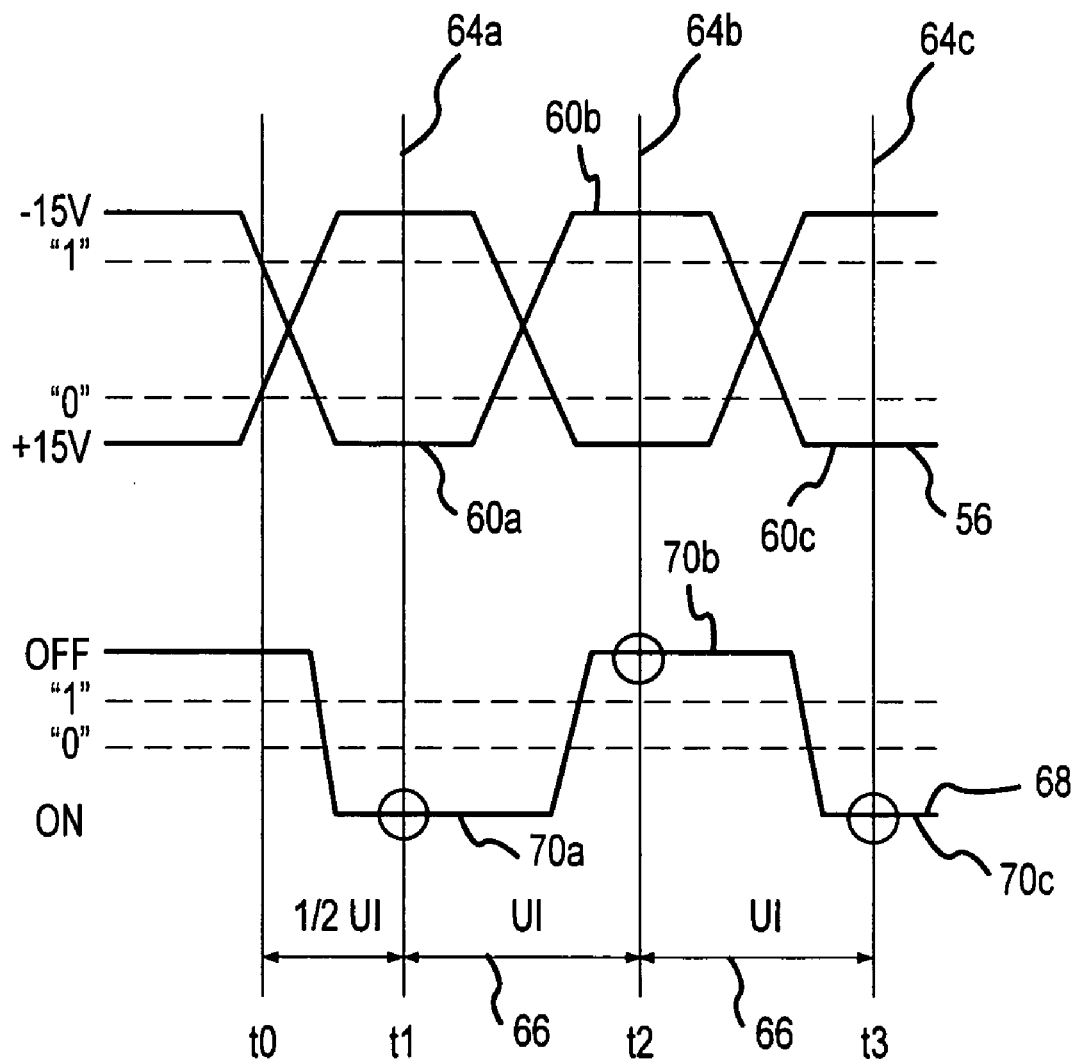
FIG. 3 illustrates how a signal based upon an optical output from the optical device of FIG. 1A embodies data from one embodiment of an EIA/TIA-232-E serial data signal that is being received or transmitted by the information processing device of FIG. 1A.

Additional evidence of the above-noted high correlation is illustrated in FIG. 3. There a serial data waveform 56 in binary form is presented of a representative serial data signal in binary form that may be provided to the information processing device 4 of FIGS. 1A–B through the data input line 16. The data waveform 56 is a plot of voltage versus time, and includes a plurality of data bits 60. The time that is required to transfer one data bit 60 in the data waveform 56 is characterized as a unit interval 66 of the corresponding serial data signal. FIG. 3 also presents the corresponding optical output waveform 68 of the optical output 46 by the optical device 12 (FIG. 1B). The optical output waveform 68 is a plot of intensity versus time, and includes what may be characterized as a plurality of optical bits 70. The logic level of each of the various data bits 60 defines or embodies the data that is being carried by the serial data signal that is represented by the data waveform 56. The logic level of the optical bits 70 in the optical output waveform 68 changes at least generally in accordance with the logic level of the data bits 60 in the data waveform 56. That is, at what may be characterized as decision times 64 in the data waveform 56, the logic level of a given data bit 60 and the logic level of its corresponding optical bit 70 match. Stated another way, at each of the various decision times 64, the optical output waveform 68 has transitioned in the same manner as the data waveform 56 such that the data that is embodied in the serial data signal it is represented by data waveform 56 is replicated in the optical output waveform 68.

Figure 4:
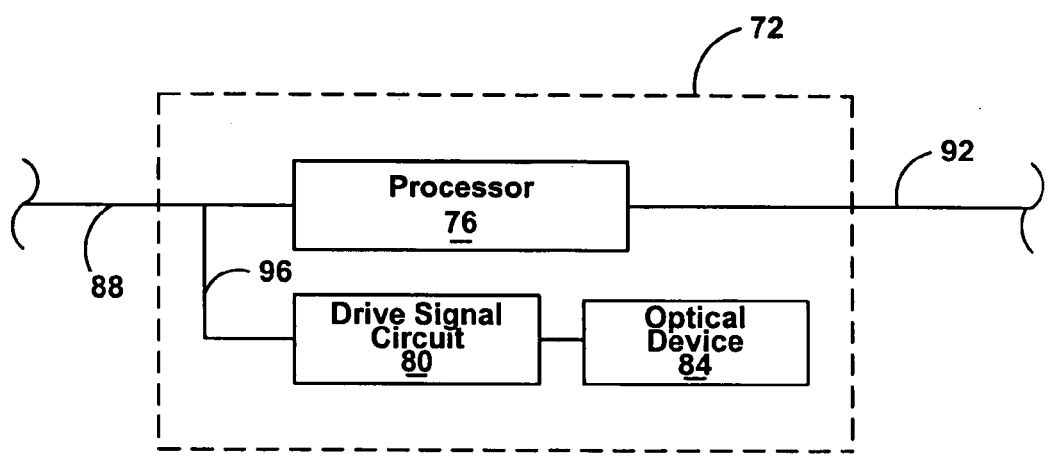
FIG. 4 illustrates one embodiment of an information processing device that utilizes an optical device that is operated by an optical device drive signal circuit that does not replicate a data signal that is being received or transmitted by the information processing device.

An information processing device 72 is presented in FIG. 4 that addresses the recognition of the above-noted correlation in a desirable manner. This information processing device 72 generally includes a processor 76 and an optical device 84. Data is transmitted to the processor 76 through a data input line 88, and is transmitted from the processor 76 through a data output line 92. A data monitoring line 96 extends from the data input line 88 to the optical device 84. It should be appreciated that the data monitoring line 96 could extend from the data output line 92 to the optical device 84 to display the state of a serial data stream that is being transmitted from the processor 76 (not shown). It should also be appreciated that there may be instances where there is only one data line for the information processing device 72 (not shown). In any case, a drive signal circuit 80 is disposed "upstream" of the optical device 84 and controls the operation thereof. Generally, the drive signal circuit 80 controls the operation of the optical device 84 in a manner such that its optical output does not replicate all of the data being transmitted to the processor 76 through the data input line 88. Stated another way, all of the data that is embodied in a serial data signal in binary form that is being transmitted to the processor 76 through the data input line 88 is not embodied in the optical output of the optical device 84. Therefore, this is a primary distinction between the information processing device 72 FIG. 4 in the information processing device 4 of FIGS. 1A–B.

Figure 5:
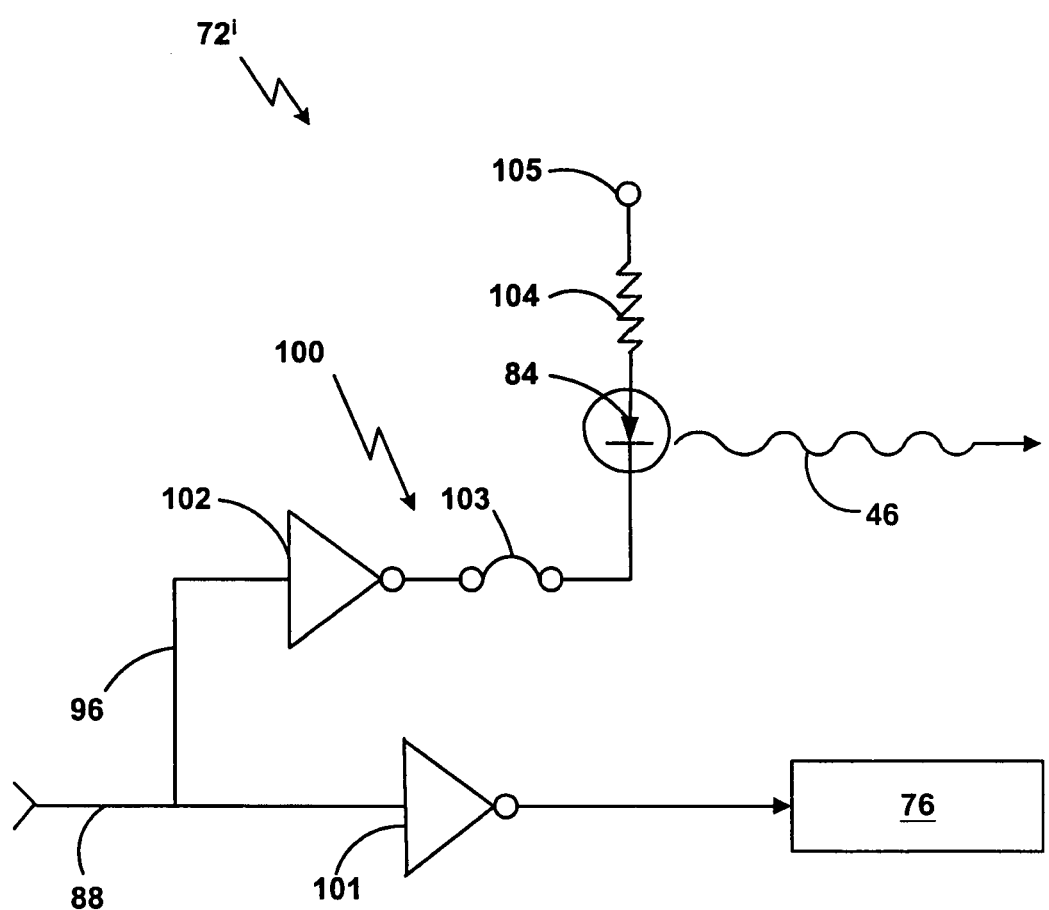
FIG. 5 illustrates one embodiment of a jumper-based drive signal circuit that may be utilized by the information processing device of FIG. 4.

An optical device drive signal circuit 100 is presented in FIG. 5 that may be used in place of the drive signal circuit 80 from the information processing device 72 of FIG. 4. Since FIG. 5 illustrates the optical device drive signal circuit 100 in place of the drive signal circuit 80 of FIG. 4, a superscripted "i" designation is used to identify the information processing device $72^i$ of FIG. 5. Data that is being transmitted through the data input line 88 is typically directed to an appropriate data signal driver 101 (e.g., an amplifier, such as RS-232 driver) before being provided to the processor 76. The data monitoring line 96 extends from the data input line 88 of the data signal driver 101. The optical device drive signal circuit 100 includes the data monitoring line 96. The circuit 100 further includes an optical device driver 102 (e.g., an amplifier), a removable jumper 103, a current limiting resistor 104, a voltage source 105, and the optical device 84 that are each electrically interconnected within the data monitoring line 96. The optical device 84 is disposed in the data monitoring line 96 between the current limiting resistor 104 and the jumper 103. The optical device driver 102 is disposed between the jumper 103 and the location where the data monitoring line 96 interfaces with the data input line 88. A serial data signal in binary form that is being transmitted to the processor 76 is thereby also directed through the data monitoring line 96 to the optical device driver 102. This serial data signal will also be transmitted to the optical device 84 when the optical device drive signal circuit 100 is in the configuration presented in FIG. 5. Optical emanations from the optical device 84 will thereby embody the same data that is embodied in the serial data signal that is being transmitted to the processor 76 in accordance with the foregoing discussion. Since this may not be desirable in at least certain instances, the jumper 103 may be removed to block the transmission of the first data signal to the optical device 84. That is, the jumper 103 may assume one of two positions. In what may be characterized as a normal position, the jumper 103 is closed and the optical device 84 will operate in accordance with any data signal being transmitted to the processor 76. In what may be characterized as a secure position, the jumper 103 is open and the operation of the optical device 84 will be disabled. Disabling the optical device 84 results in there being no optical output of any kind (i.e., the device 84 is in effect turned off). Therefore, data that is embodied in any data signal that is being transmitted to the processor 76 should not be able to be retrieved by monitoring the optical emanations of the optical device 84.

Figure 6:
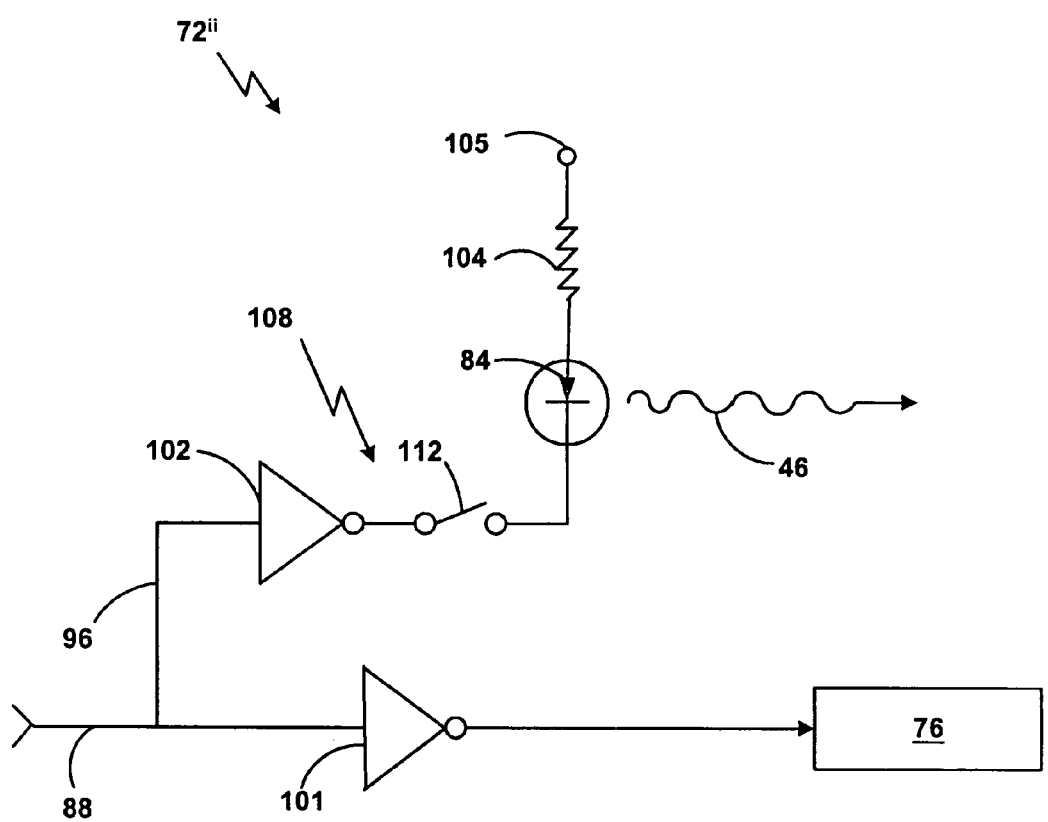
FIG. 6 illustrates one embodiment of a switch-based drive signal circuit that may be utilized by the information processing device of FIG. 4.

An optical device drive signal circuit 108 is presented in FIG. 6 that may be used in place of the drive signal circuit 80 from the information processing device 72 of FIG. 4. Since FIG. 6 illustrates the optical device drive signal circuit 108 in place of the drive signal circuit 80 of FIG. 4, a superscripted "ii" designation is used to identify the information processing device $72^{ii}$ of FIG. 6. The main difference between the optical device drive signal circuit 108 of FIG. 6 and the optical device drive signal circuit 100 of FIG. 5 is the use of a switch 112 versus the jumper 103. The switch 112 in the case of the circuit 108 similarly allows for two modes of operation. When the switch 112 is in a closed position, a serial data signal in binary form that is being transmitted to the processor 76 is thereby also directed through the data monitoring line 96, to the optical device driver 102, and to the optical device 84. Optical emanations of the optical device 84 will thereby embody the same data that is embodied in the serial data signal that is being transmitted to the processor 76 in accordance with the foregoing discussion. Since this may not be desirable in at least certain instances, the switch 112 may be moved to an open position to block the transmission of the serial data signal to the optical device 84. In what may be characterized as a normal position, the switch 112 is closed and the optical device 84 will operate in accordance with any data signal being transmitted to the processor 76. In what may be characterized as a secure position, the switch 112 is open and the operation of the optical device 84 will be disabled. Disabling the optical device 84 results in there being no optical output of any kind (i.e., the device 84 is in effect turned off). Therefore, data that is embodied in any data signal that is being transmitted to the processor 76 should not be able to be retrieved by monitoring the optical emanations of the optical device 84.

Figure 7:
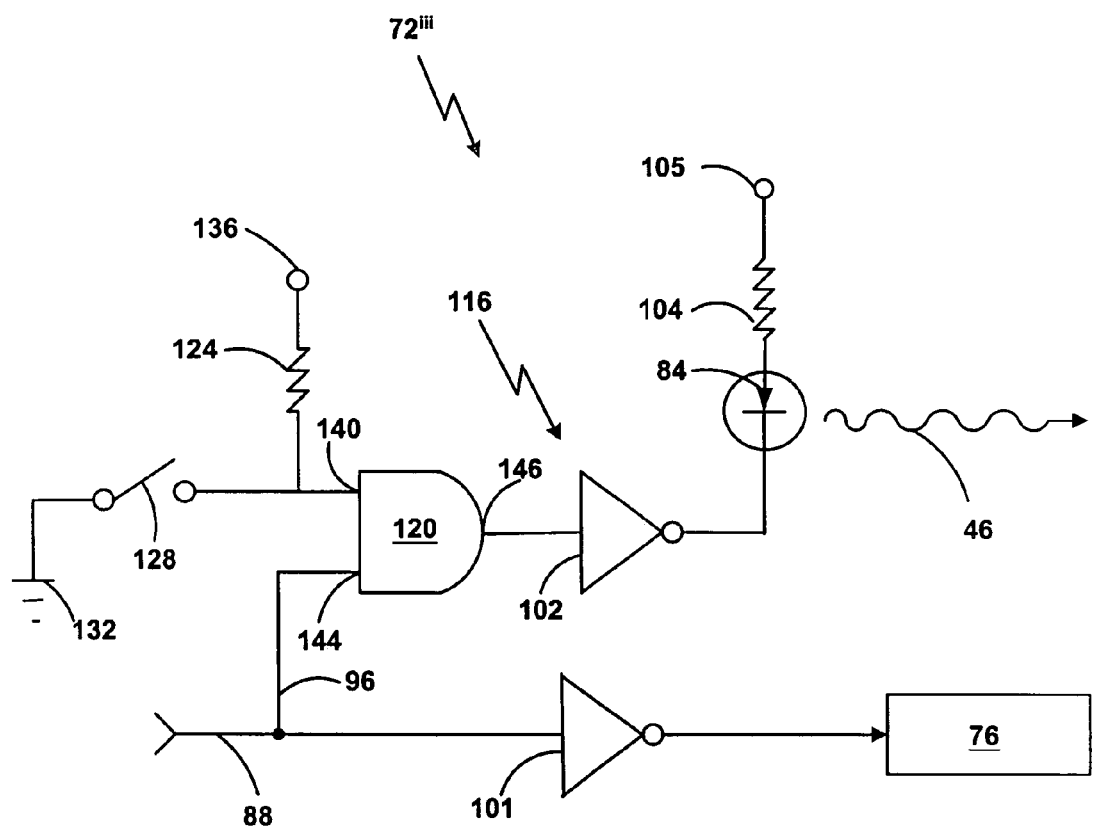
FIG. 7 illustrates one embodiment of an AND-gate-based drive signal circuit that may be utilized by the information processing device of FIG. 4.

An optical device drive signal circuit 116 is presented in FIG. 7 that may be used in place of the drive signal circuit 80 from the information processing device 72 of FIG. 4. Since FIG. 7 illustrates the optical device drive signal circuit 116 in place of the drive signal circuit 80 of FIG. 4, a superscripted "iii" designation is used to identify the information processing device $72^{iii}$ of FIG. 7. The main difference between the optical device drive signal circuit 116 of FIG. 7 and the optical device drive signal circuit 100 of FIG. 5 is the use of an AND-gate 120 versus the jumper 103. A voltage source 136, a pull-up resistor 124, a switch 128, and a ground 132 are electrically interconnected with the AND-gate 120 and define a control or first input 140 for the AND-gate 120. Any way of providing the control or first input 140 for the AND-gate 120 may be utilized (e.g., providing a logic-level signal from some other circuit). The data monitoring line 96 also feeds into the AND-gate 120 and defines a second input 144. The AND-gate 120 in effect allows for two modes of operation by selectively allowing or precluding the transmission of the serial data signal to the optical device 84 that is being transmitted to the processor 76. When the switch 128 is in an open position, the pull-up resistor 124 holds the first input 140 of the AND-gate 120 "true." The output 146 of the AND-gate 120 then mirrors the logic level of the serial data signal being transmitted to the processor 76, and the optical device 84 is thereby modulated in accordance with this serial data signal. Optical emanations of the optical device 84 will thereby embody the same data that is embodied in the serial data signal that is being transmitted to the processor 76 in accordance with the foregoing discussion. Since this may not be desirable in at least certain instances, the switch 128 may be moved to a closed position such that the first input 140 of the AND-gate 120 is held for "false." The output 146 from the AND-gate 120 is thereby "false" as well. This blocks the transmission of the first data signal to the optical device 84. In what may be characterized as a normal mode, the AND-gate 120 allows an output in the form of the data signal and the optical device 84 will operate in accordance with any data signal being transmitted to the processor 76. In what may be characterized as a secure mode, the AND-gate 120 does not allow any output and the operation of the optical device 84 will be disabled. Disabling the optical device 84 results in there being no optical output of any kind (i.e., the device 84 is in effect turned off). Therefore, data that is embodied in any data signal that is being transmitted to the processor 76 should not be able to be retrieved by monitoring the optical emissions from the optical device 84.

Figure 8:
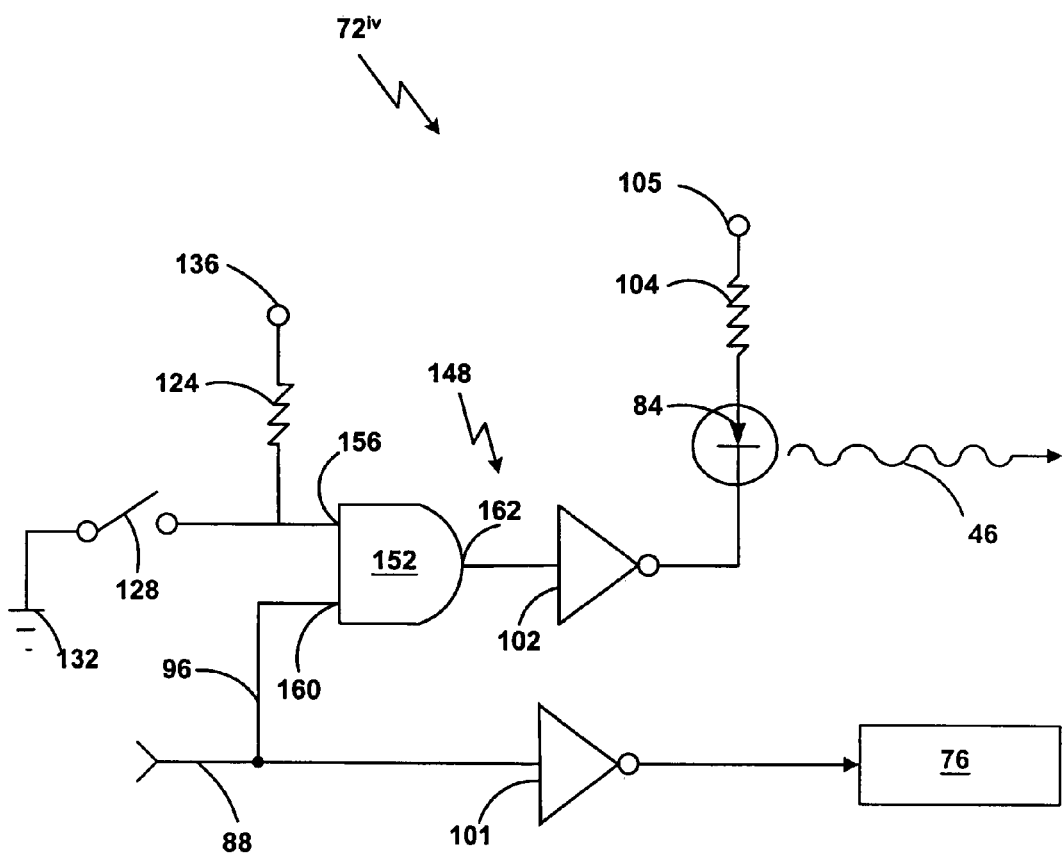
FIG. 8 illustrates one embodiment of an OR-gate-based drive signal circuit that may be utilized by the information processing device of FIG. 4.

An optical device drive signal circuit 148 is presented in FIG. 8 that may be used in place of the drive signal circuit 80 from the information processing device 72 of FIG. 4. Since FIG. 8 illustrates the optical device drive signal circuit 148 in place of the drive signal circuit 80 of FIG. 4, a superscripted "iv" designation is used to identify the information processing device $72^{iv}$ of FIG. 8. The main difference between the optical device drive signal circuit 148 of FIG. 8 and the optical device drive signal circuit 116 of the FIG. 7 embodiment is the use of an OR-gate 152 versus the AND-gate 120. A voltage source 136, a pull-up resistor 124, a switch 128, and a ground 132 are electrically interconnected with the OR-gate 152 and define a control or first input 156 for the OR-gate 152. Any way of providing the control or first input 156 for the OR-gate 152 may be utilized (e.g., providing a logic-level signal from some other circuit). The data monitoring line 96 also feeds into the OR-gate 152 as a second input 160. The OR-gate 152 in effect allows for two modes of operation by selectively allowing or disallowing the transmission of the serial data signal to the optical device 84 that is being transmitted to the processor 76. When the switch 128 is in a closed position, the first input 156 of the OR-gate 152 is held in the logical-false state such that the output 162 of the OR-gate 152 mirrors the data signal being transmitted to the processor 76. Optical emanations from the optical device 84 will thereby embody the same data that is embodied in the serial data signal that is being transmitted to the processor 76 in accordance with the foregoing discussion. Since this may not be desirable in at least certain instances, the switch 128 may be moved to an open position such that the first input 156 of the OR-gate 152 is held in the logical-true state by the pull-up resistor 124 such that the output 162 from the OR-gate 152 to the optical device 84 is a constant logic level signal. As such, the optical device 84 is retained in a continually "on" or "lit" condition. In what may be characterized as a normal mode, the OR-gate 152 allows an output in the form of the data signal and the optical device 84 will operate in accordance with any data signal being transmitted to the processor 76. In what may be characterized as a secure mode, the OR-gate 152 outputs a signal to the optical device 84 that retains the optical device 84 in its "on" or "lit" condition. Therefore, data that is embodied in any data signal that is being transmitted to the processor 76 should not be able to be retrieved by monitoring the optical termination of the optical device 84.

Figure 9:
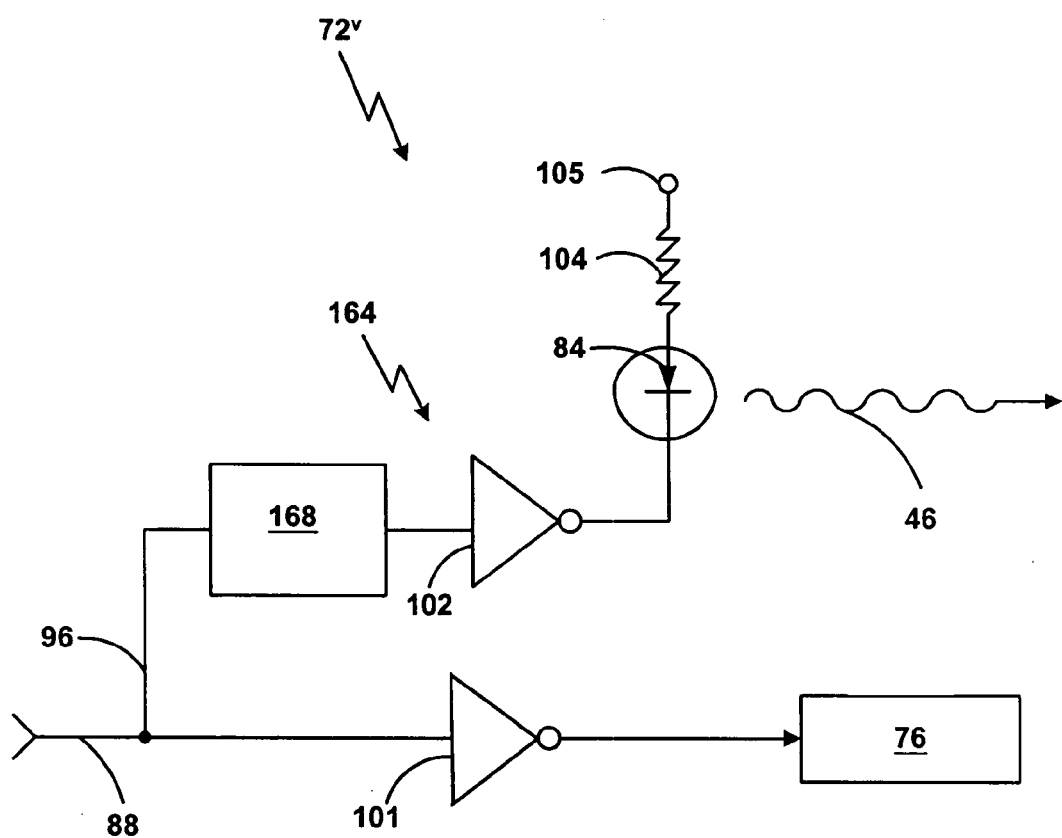
FIG. 9 illustrates one embodiment of a pulse stretcher-based drive signal circuit that may be utilized by the information processing device of FIG. 4.

An optical device drive signal circuit 164 is presented in FIG. 9 that may be used in place of the drive signal circuit 80 from the information processing device 72 of FIG. 4. Since FIG. 9 illustrates the optical device drive signal circuit 164 in place of the drive signal circuit 80 of FIG. 4, a superscripted "v" designation is used to identify the information processing device $72^{v}$ of FIG. 9. The main difference between the optical device drive signal circuit 164 of FIG. 9 and the optical device drive signal circuit 100 of FIG. 5 is the use of a pulse stretcher 168 versus the jumper 103. The pulse stretcher 168 modifies the waveform of the data signal that is being transmitted to the processor 76, and then outputs this modified waveform to the optical device 84. Generally, the waveform of the data signal that is being transmitted to the processor 76 is modified by the pulse stretcher 168 in such a manner that all of the data that is embodied in this data signal is not embodied in the waveform that is then used to operate the optical device 84. Therefore, data that is embodied in any data signal that is being transmitted to the processor 76 should not be able to be retrieved by monitoring the optical emanations of the optical device 84.

The waveform modification provided by the pulse stretcher 168 in the FIG. 9 embodiment may be characterized as modifying the duty cycle of the waveform of the data signal that is being transmitted to the processor 76 of the information processing device 72 of FIG. 4. The pulse stretcher 168 may be configured so as to modify the data signal that is being transmitted to the processor 76 by outputting a waveform to the optical device 84 that has a certain minimum pulse width. The "unit interval" is the time that is required to transfer one bit of information or the time between adjacent pulses or transitions. In one embodiment, the output from the pulse stretcher 168 is a waveform having a minimum pulse width that is at least 1.5 times greater than the unit interval of the data signal that is being transmitted to the processor 76 or of the slowest expected data rate. In another embodiment, the output from the pulse stretcher 168 is a waveform having a minimum pulse width that is at least 2.0 times greater than the unit interval of the data signal that is being transmitted to the processor 76 or of the slowest expected data rate.

The pulse stretcher 168 of the FIG. 9 embodiment may be configured so as to modify the data signal that is being transmitted to the processor 76 by outputting a waveform to the optical device 84 that controls the minimum "on" time of the optical device 84 (when providing an optical output), the minimum "off" time of the optical device 84 (when not providing an optical output or when "dark"), or both. The pulse stretcher 168 may be configured to output a waveform that provides a minimum "on" time for the optical device 84 that is at least 1.5 times greater in one embodiment, and that is at least 2.0 times greater in another embodiment, than the unit interval of at least one of a current data rate or a slowest data rate that is associated with the data signal that is being transmitted to the processor 76. The pulse stretcher 168 also may be configured to output a waveform that provides a minimum "off" time for the optical device 84 that is at least 1.5 times greater in one embodiment, and that is at least 2.0 times greater in another embodiment, than a unit interval of at least one of a current data rate or a slowest data rate that is associated with the data signal that is being transmitted to the processor 76. The pulse stretcher 168 also may be configured to output a waveform that provides both a minimum "on" and "off" time for the optical device 84 that is at least 1.5 times greater in one embodiment, and that is at least 2.0 times greater in another embodiment, than a unit interval of at least one of a current data rate or a slowest data rate that is associated with the data signal that is being transmitted to the processor 76.

In another embodiment, the pulse stretcher 168 may also be configured to output a waveform that provides either a minimum "on" time or a minimum "off" time, or both, that is at least equal to the duration of at least one character, and including the framing thereof (i.e., including the start, the stop bit, and the data bits therebetween) of at least one of a current data rate or a slowest data rate that is associated with the data signal that is being transmitted to the processor 76.

One way in which the pulse stretcher 168 of the FIG. 9 embodiment may provide one or more of the above-noted functions is by using a low-pass filter for the pulse stretcher 168. Consider the case of where a serial data signal in binary form is being transmitted through the data input line 88 to both the processor 76 and the pulse stretcher 168 of the information processing device 72$^y$ of FIG. 9. Such a signal has a plurality of transitions between the 0 and 1 logic levels. Generally, in the case where the pulse stretcher 168 is a low-pass filter, the pulse stretcher 168 would not output a transition in the waveform to the optical device 84 unless a certain minimum amount of time had passed from the previous-in-time transition. Another way to characterize this filtering function is in terms of the "pulses" in the data signal that is being transmitted to both the processor 76 and the pulse stretcher 168. These "pulses" are defined by each pair of adjacent-in-time transitions in this data signal. The low-pass filtering function that may be provided by the pulse stretcher 168 "masks out" pulses that are less than a certain minimum width, and thereby only allow pulses in the output to the optical device 84 that are of at least of a certain minimum width. As such, at least some of the data that is embodied in any data signal being transmitted to the processor numerical 76 will not exist in the waveform that is outputted by the pulse stretcher 168 to the optical device 84.

Figure 10:
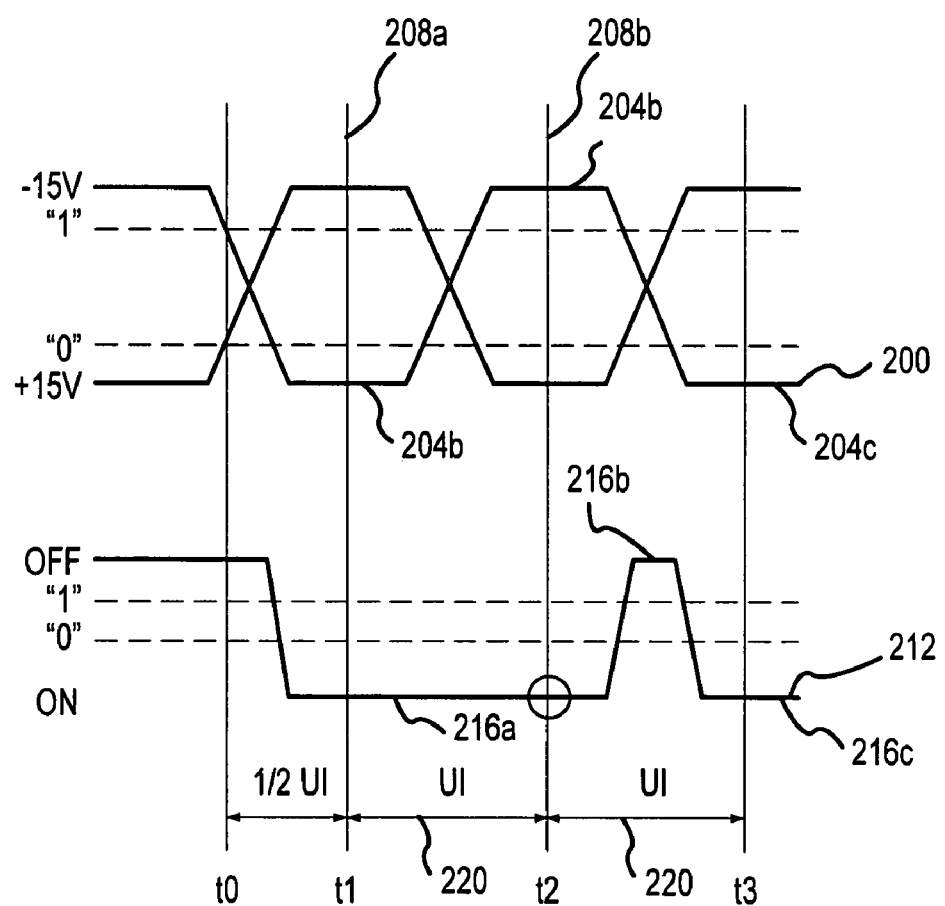
FIG. 10 illustrates one embodiment of a data signal trace or waveform being received by or transmitted from the information processing device of FIG. 9, as well as the corresponding optical output-based trace or waveform from its optical device and thereby after passing through its pulse stretcher.

FIG. 10 illustrates one type of waveform modification function that may be provided by the pulse stretcher 168 of the FIG. 9 embodiment. There a serial data waveform 200 in binary form is presented of a representative serial data signal that may be provided to the information processing device 72$^y$ of FIG. 9 through the data input line 88. The data waveform 200 is a plot of voltage versus time, and includes a plurality of data bits 204. The time that is required to transfer one data bit 204 in the data waveform 200 is characterized as a unit interval 220 of the corresponding serial data signal. FIG. 10 also presents the corresponding optical output waveform 212 of the optical emanations of the optical device 84 of the FIG. 9 embodiment. The optical output waveform 212 is a plot of intensity versus time, and includes what may be characterized as a plurality of optical bits 216. The logic level of each of the various data bits 204 defines or embodies the data that is being carried by the data waveform 200. The data waveform 200 includes what may be characterized as a plurality of decision times 208. These decision times 208 are the times when the logic level of the data waveform 200 is read by the decoder/out around to retrieve the data from the data waveform 200. At the decision time 208a, the logic level of the data bit 204a is 0 and the logic level of the optical bit 216a is also 0. However, the logic level of the data bit 204b is 1 and the logic level of the optical bit 216a is 0 at the decision time 208b. Therefore, at least some of the data that is embodied in the data waveform 204 (e.g., data bit 208b) is not embodied in the optical output waveform 212. As such, any monitoring of the optical emanations are of the optical device 84 will not allow for the retrieval of the entire data stream being directed to the processor 76 in the case of the FIG. 9 embodiment.

Figure 11:
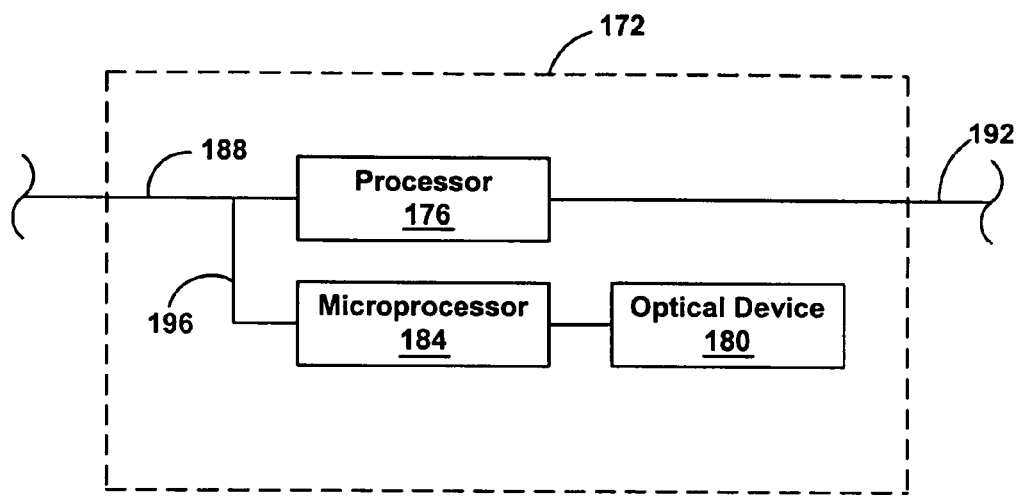
FIG. 11 illustrates one embodiment of an information processing device that utilizes an microprocessor-controlled optical device.

Another option for operating an optical device so as to not replicate a data signal is presented in FIG. 11. FIG. 11 presents an information processing device 172 that generally includes a processor 176 and an optical device 180. Data is transmitted to the processor 176 through a data input line 188, and is transmitted from the processor 176 through a data output line 192. A data monitoring line 196 extends from the data input line 188 to the optical device 180. It should be appreciated that the data monitoring line 196 could extend from the data output line 192 to the optical device 180 (not shown). It should also be appreciated that there may be instances where there is only one data line for the information processing device 172. In any case, a microprocessor 184 is disposed "upstream" of the optical device 180 and controls the operation of the optical device 180. Generally, the microprocessor 184 is programmed in such a manner such that the optical device 180 is modulated so that its optical emanations do not replicate all of the data being transmitted to the processor 176 through the data input line 188. Stated another way, all of the data that is embodied in a serial data signal being transmitted to the processor 176 through the data input line 188 is not embodied in the optical output of the optical device 180 as a result of the control provided by the microprocessor 184.

Figure 12:
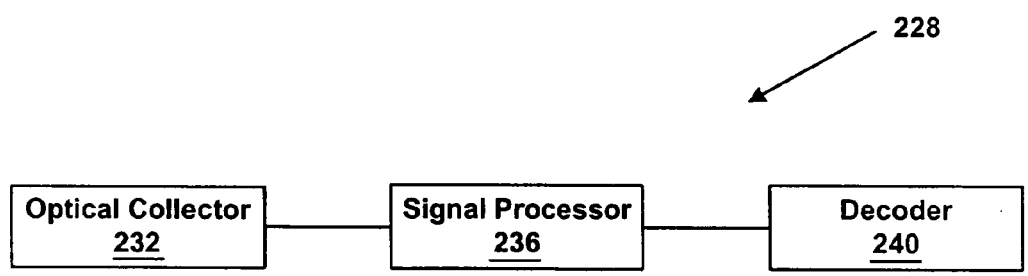
FIG. 12 illustrates one embodiment of a data processing system that may be utilized to decode an optical output-based signal.

The above-noted recognition, namely that the optical output from the optical device 12 of the information processing device 4 of FIG. 1A may at least in certain situations replicate a data signal being transmitted through the data input line 16 to the information processing device 4, may be addressed in a different manner than the discussion thus far. Generally, one may utilize this recognition to retrieve data that is being transmitted by monitoring the optical output of the optical device 12. One embodiment that accomplishes this function is illustrated in FIG. 12. There a data processing system 228 is illustrated that includes an optical collector 232, a signal processor 236, and a decoder 240. Generally, the optical collector 232 collects the optical output from the optical device 12 of FIG. 1A. Any appropriate configuration may be utilize to for the optical collector 232, including without limitation telescopic optics, directly by an optical sensor, and by other means of conveying the optical output of the first optical device to an optical sensor. Typically, the optical output will be monitored remotely from the information processing device so as to at least reduce the potential for detection by the owner or operator of the information processing device. That is, data processing system 228 will typically be utilized by a third party to retrieve date being received, transmitted, or otherwise processed by an owner or operator of an information processing device.

Usually at least some type of signal processing will be required before the optical output may be decoded to retrieve the data that is embodied in this optical output. In one embodiment, the signal processor 236 includes structure to convert the optical signal to an electrical signal, as well as possibly structure to amplify the resulting electrical signal, to address noise in the resulting electrical signal, or both. It may be possible that this type of optical-to-electrical conversion will not be required. The conversion from an optical signal to an electrical signal may be accomplished using one or more photodetectors, photomultipliers, phototransistors, photodiodes, any optical-to-electrical converter, or any combination of such devices. Generally, the decoder 240 is a computer. Any appropriate algorithm may be utilized by the decoder 240 to provide the decoding function. In one embodiment, the decoder 240 is a USART (universal synchronous-asynchronous receiver-transmitter).

There are in effect a limited number of formats for serial signals in binary form. Each such signal typically has a start symbol, followed by a plurality of data bits, followed by a stop symbol. The plurality of data bits between a start symbol and a stop symbol are commonly referred to as a byte or a character. One embodiment that illustrates the above-noted characteristics of a typical serial data signal in binary form is presented in FIG. 13 in the form of a data signal 244. This data signal 244 includes a start bit 248, eight data bits 252 that define a byte 258, and a stop bit 256. The logic level of the start bit 248 is a 0, the logic level of the data bit 252*a* is a 1, the logic level of each of the data bits 252*b–f* is a 0, the logic level of data bit 252*g* is a 1, the logic level of the data bit 252*h* is a 0, and the logic level of the stop bit 256 is a 1. Other data formats exist, with the most common being 7 or 8 bits per byte. Knowledge of this format may be used to decode the serial data signal 244.

Figure 13:
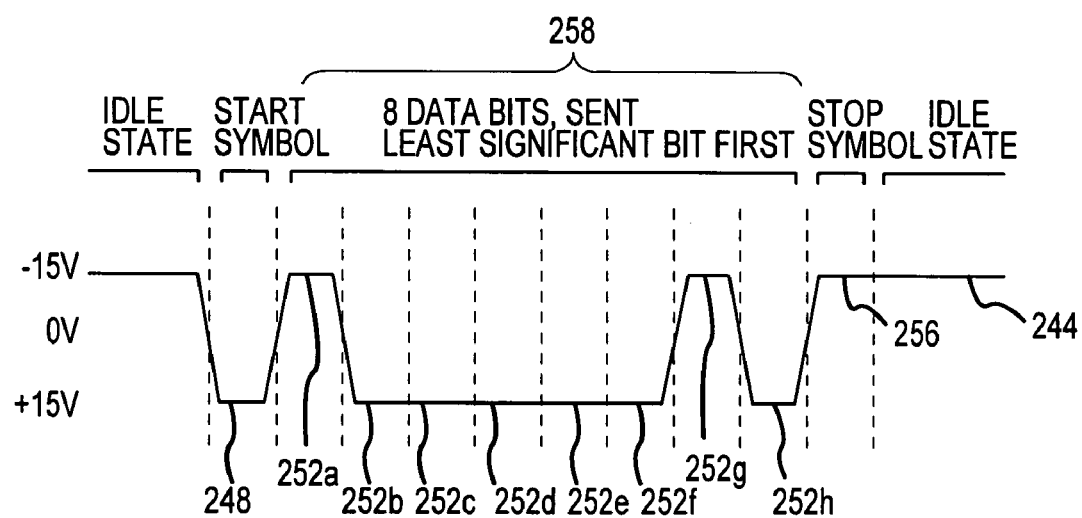
FIG. 13 illustrates one embodiment of a data signal trace or waveform having a start bit, a byte that is defined by a plurality of data bits, and a stop bit.
Figure 14A:
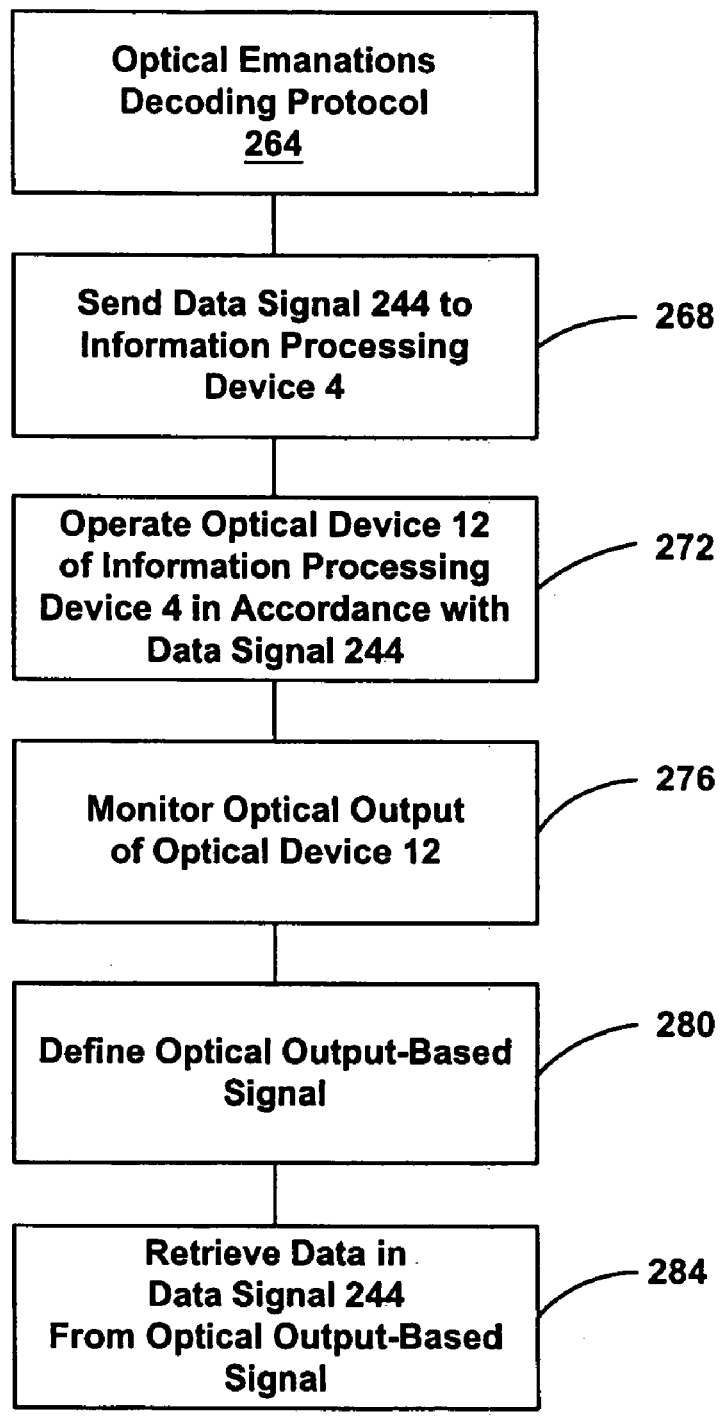
FIG. 14A illustrates one embodiment of an optical emanations decoding protocol that may be utilized by the decoder of the data processing system of FIG. 12.

The general manner of operation of the data processing system 228 of FIG. 12 is depicted in FIG. 14A. FIG. 14A is characterized in terms of an optical emanations decoding protocol 264. This protocol 264 may be used by the decoder 240 of FIG. 12, and also may be used to decode the type of data signal 244 that is illustrated in FIG. 13. Although the decoding protocol 264 will be described in relation to transmitting the data signal 244 of FIG. 13 to the information processing device 4 of FIG. 1A, it may be utilized for any appropriate serial data signal in binary form and in relation to any information processing device having an optical device that displays in a state of the serial data stream that crosses an interface of the information processing device in a manner that replicates the data signal.

The decoding protocol 264 of FIG. 14A includes a step 268 where the data signal 244 is transmitted to the information processing device 4. The optical device 12 that is associated with this information processing device 4 is modulated in accordance with this data signal 244 (step 272). The optical output of the optical device 12 is monitored at step 276. An optical output-based signal is defined at step 280. For purposes of the operation of the decoding protocol 264, this optical output-based signal will have a waveform at least generally similar to that of the data signal 244 in accordance with the above-noted discussions. The decoding protocol 264 concludes with a step 284 where data from the data signal 244 is retrieved from the optical output-based signal.

Figure 14B:
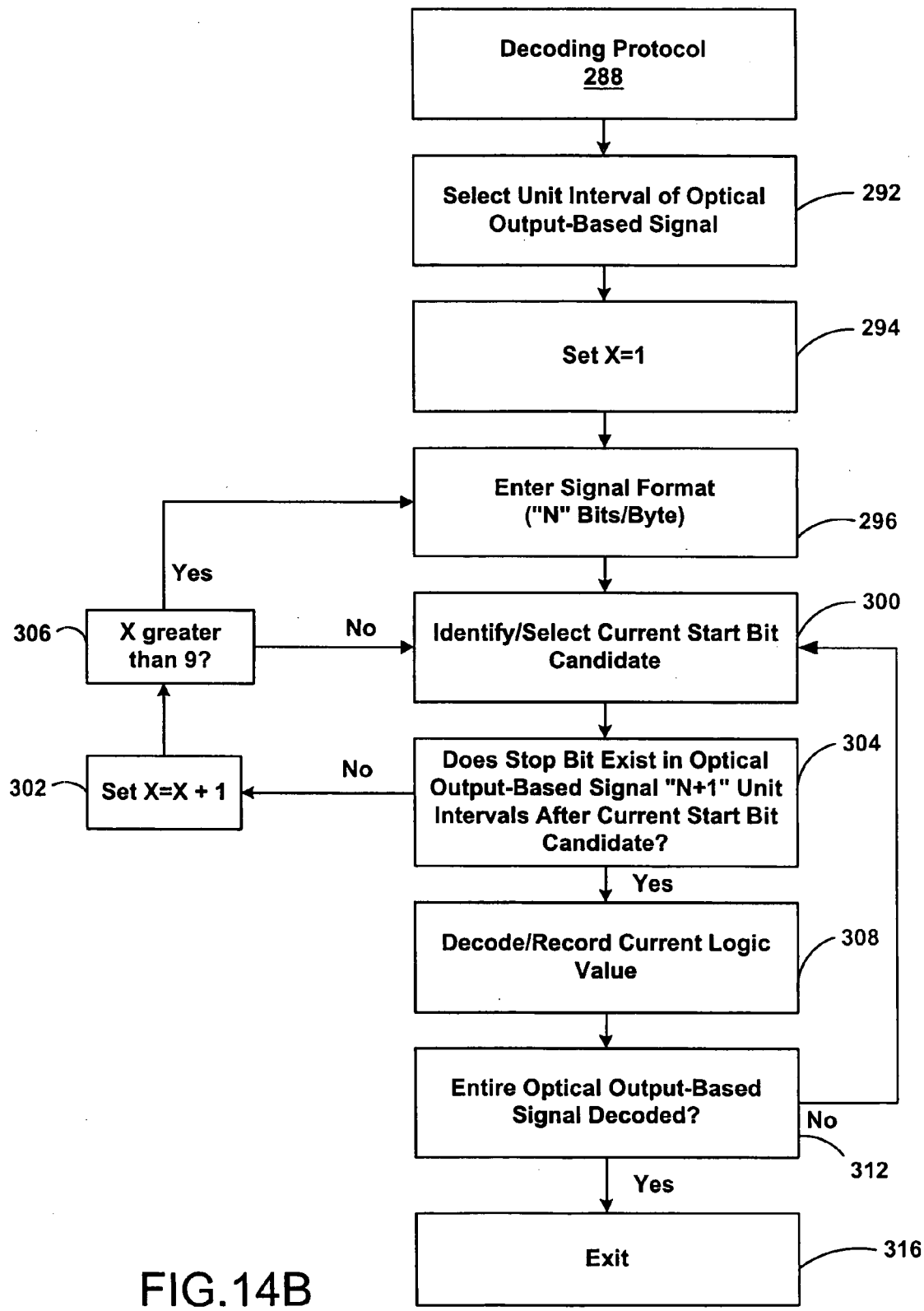
FIG. 14B illustrates another embodiment of an optical emanations decoding protocol that may be utilized by the decoder of the data processing system of FIG. 12.

One way for decoding a serial signal in binary form is presented in FIG. 14B in the form of the decoding protocol 288. There are three preliminary steps to the protocol 288, and they may be executed in any order. Step 292 of the decoding protocol 288 is directed to selecting the unit interval of the optical output-based signal to be decoded, step 296 is directed to entering the signal format or how many bits there are in each byte ("N"), and step 294 sets a counter "X" equal to 1. The unit interval may be determined by actual knowledge, by scanning the optical output-based signal to identify the smallest time period between any pair of adjacent-in-time transitions in the optical output-based signal being evaluated, or even by assuming a unit interval, although this would require a slight modification of the protocol 288 at least generally in accordance with the decoding protocol 380 of FIG. 17. The signal format that is entered in step 296 may be based upon an assumption or based upon actual knowledge.

The decoding protocol 288 of FIG. 14B includes a step 300 that is directed to identifying or otherwise selecting a current start bit candidate. Typically this will be done by scanning the optical output-based signal from step 292 in a forward-in-time basis (e.g., from left to right). The first current start bit candidate that is identified or selected in step 300 will typically be for the first transition in the optical output-based signal of step 292 that goes from a logic level 1 to a logic level 0. Step 304 evaluates the optical output-based signal of step 292 to determine if there is a stop bit that occurs "N+1" unit intervals after the current start bit candidate of step 300. In the event that the value of "N" from step 296 is 8, and if the current start bit candidate from step 300 is indeed a start bit, the logic level of the optical output-based signal from step 292 at a time that is 9 unit intervals after this current start bit candidate should be a 1. The existence of a stop bit at this particular time allows the decoding protocol 288 to proceed from step 304 to step 308. There the logic level of each of the bits in the current byte are decoded and/or recorded for decoding and later time. The decoding protocol 288 then proceeds to step 312 where a determination is made as to whether the entirety of the optical output-based signal of step 292 has been decoded. If the entire optical output-based signal of step 292 has been decoded, the decoding protocol 288 exits at step 316. Otherwise, the decoding protocol 288 returns control to step 300 for repetition of the above-noted analysis for the next-in-time byte in the optical output-based signal of step 292.

If a stop bit does not exist at the time noted in relation to step 304 of the decoding protocol 288, the decoding protocol 288 proceeds to a step 302 that increases the counter "X" by a value of 1. A determination is made at step 306 as to whether the value of the counter "X" is greater than 9. This assumes a signal format of 8 bits per byte. Other appropriate values may be utilized for the counter "X" at step 306. In any case, if the value of the counter "X" is determined to be 9 or less at step 306, the decoding protocol 288 returns to step 300 where a new current start bit candidate is identified or selected in the above-noted manner (typically the next-in-time transition from a logic level 1 to a logic level 0), and step 304 is repeated for this new current start bit candidate. If the value of the counter "X" is determined to be greater than 9 at step 306, the decoding protocol 288 returns to step 296 where a new signal format may be entered for repetition of the protocol 288 in accordance with the foregoing using this new information.

Figures 15A, 15B:
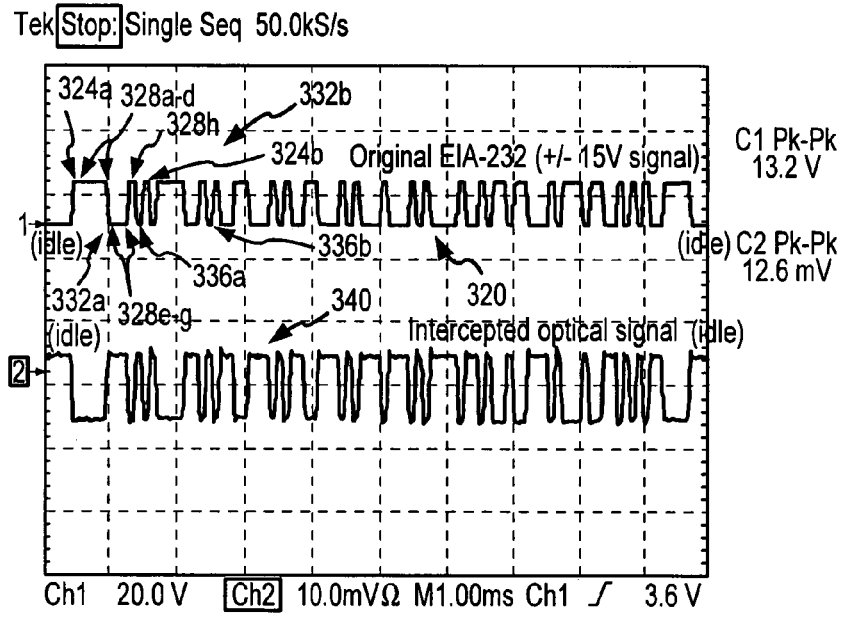
FIG. 15A illustrates one embodiment of a data signal trace or waveform being received by or transmitted from the information processing device of FIG. 1A, as well as the corresponding optical output-based trace or waveform from its optical device.
FIG. 15B illustrates a table of the data that is embodied in the data signal trace or waveform of FIG. 15A, based upon an analysis of the optical output-based trace or waveform of FIG. 15A.

FIGS. 15A–B illustrate the operation of the decoding protocol 288 of FIG. 14B. FIG. 15A illustrates a data waveform 320 that may be transmitted to the information-processing device 4 of FIG. 1A, as well as an optical output-based waveform 340 that may be retrieved by the data collection system 228 of FIG. 12. FIG. 15B presents a table that may be generated by the decoder 240 of the data processing system 228 of FIG. 12 using the decoding protocol 288 of FIG. 14B to evaluate the optical output-based waveform 340 of FIG. 15A. The data waveform 320 includes a first start bit 324a having a logic level of 0, followed by four data bits 328a–d having a logic level of 1, followed by three data bits 328e–g having a logic level of 0, followed by a data bit 328h having a logic level of 0, followed by a stop bit 336a having a logic level of 1. The data bits 328a–h define a data byte or character 332a. Seven other bytes or characters 332 are provided in the data waveform 320, including a data byte or character 332a that is framed by a start bit 324b having a logic level of 0 and a stop bit 336b having a logic level of 1. The optical waveform 340 replicates the data waveform 320 at the times that the logic level is checked for each of the data bits 328 in the data waveform 320.

The optical waveform 340 is inverted in relation to the data waveform 320. However, the existence of this inversion may be readily identified during decoding. All that need be done to read the data bits in the optical waveform 340 is to first reverse their logic level and then decode the waveform 340. This is represented in the table of FIG. 15B, which depicts the actual decoding of the optical waveform 340. The table presented in FIG. 15B identifies each byte or character 332 in the optical waveform 340, the logic level 360 of each data bit in the optical waveform 340, the reversal 364 of the logic level 360 for each of these data bits in the optical waveform 340, and the reversed and framed format 368 for each of these data bits in the optical waveform 340.

Figure 16:
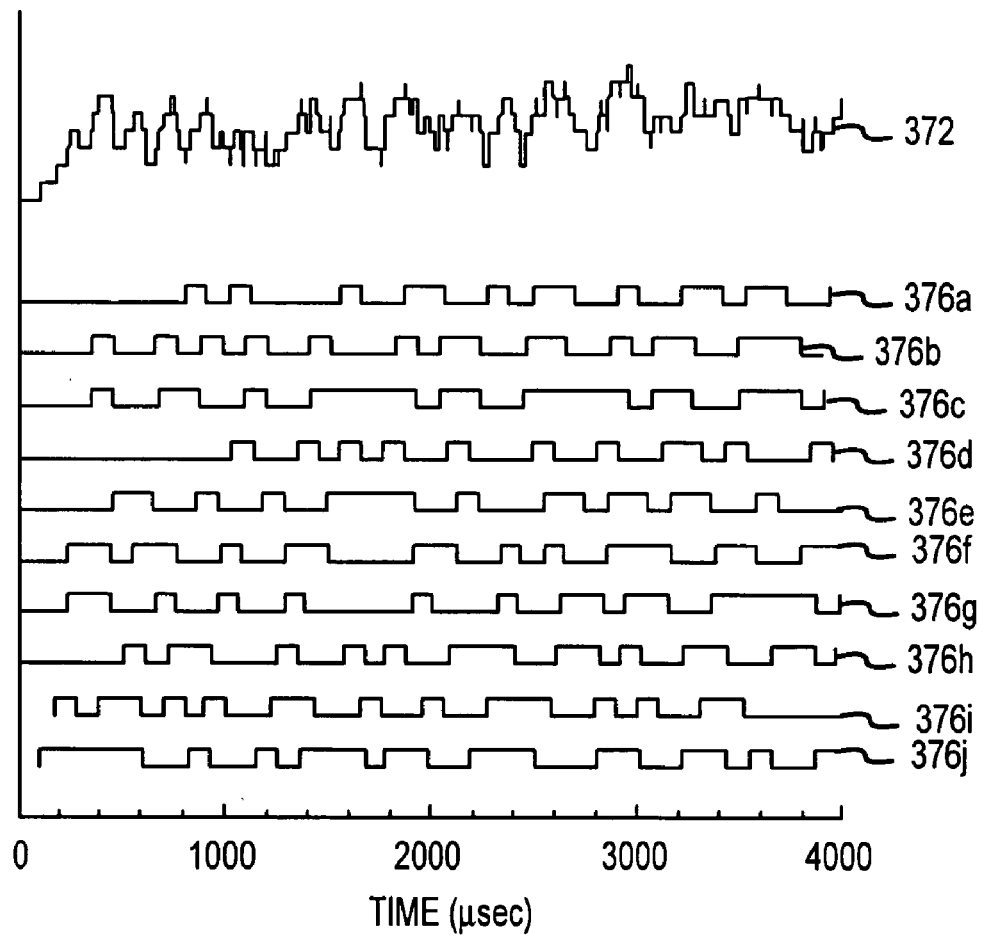
FIG. 16 illustrates one embodiment of a cumulative optical output-based trace or waveform and the individual optical output-based traces or waveform is that define this cumulative optical output-based trace or waveform.

In some cases, it may be desirable to retrieve data from the optical output of the optical device 12 of a particular information processing system of FIG. 1A when there are a plurality of information processing systems 4 operating in the same space or area. In this case it may be difficult to monitor the optical output of only a single optical device 12 (i.e. to limit the optical emanations been collected to those coming from a single optical device 12). The resulting optical output-based signal will likely be the cumulative result of all of the optical devices 12. FIG. 16 presents one embodiment of a cumulative optical waveform 372 that is defined by a plurality of individual optical waveforms 376a–j. It is possible to not only identify each of these individual optical waveforms 376a–j, but to then be able to decode each of the optical waveforms 376a–j. Two different decoding protocols for this situation are presented in FIGS. 17 and 18. There are a number of limitations or requirements for using either of these protocols. One is that each of the individual optical waveforms 376 must have the same data format (i.e., the same logic level for the start bit, the same number of bits per byte, the same logic level for the stop bit, and the same unit interval). Moreover, the precise starting time of each of the individual optical waveforms 376 must not overlap.

Figure 17:
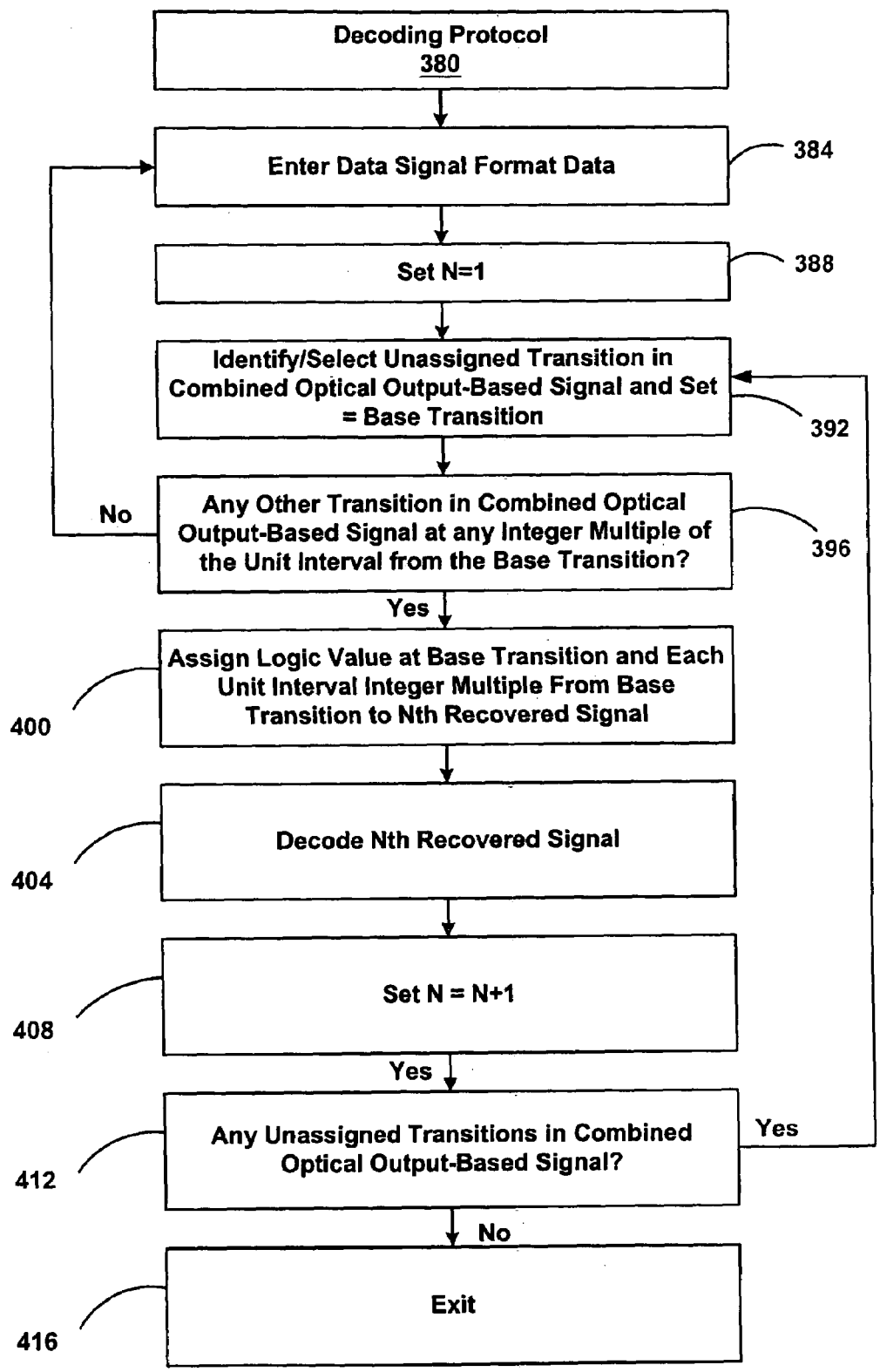
FIG. 17 illustrates one embodiment of an optical emanations decoding protocol that may be utilized by the decoder of the data processing system of FIG. 12 to address the type of cumulative optical output-based trace or waveform of FIG. 16.
Figure 18:
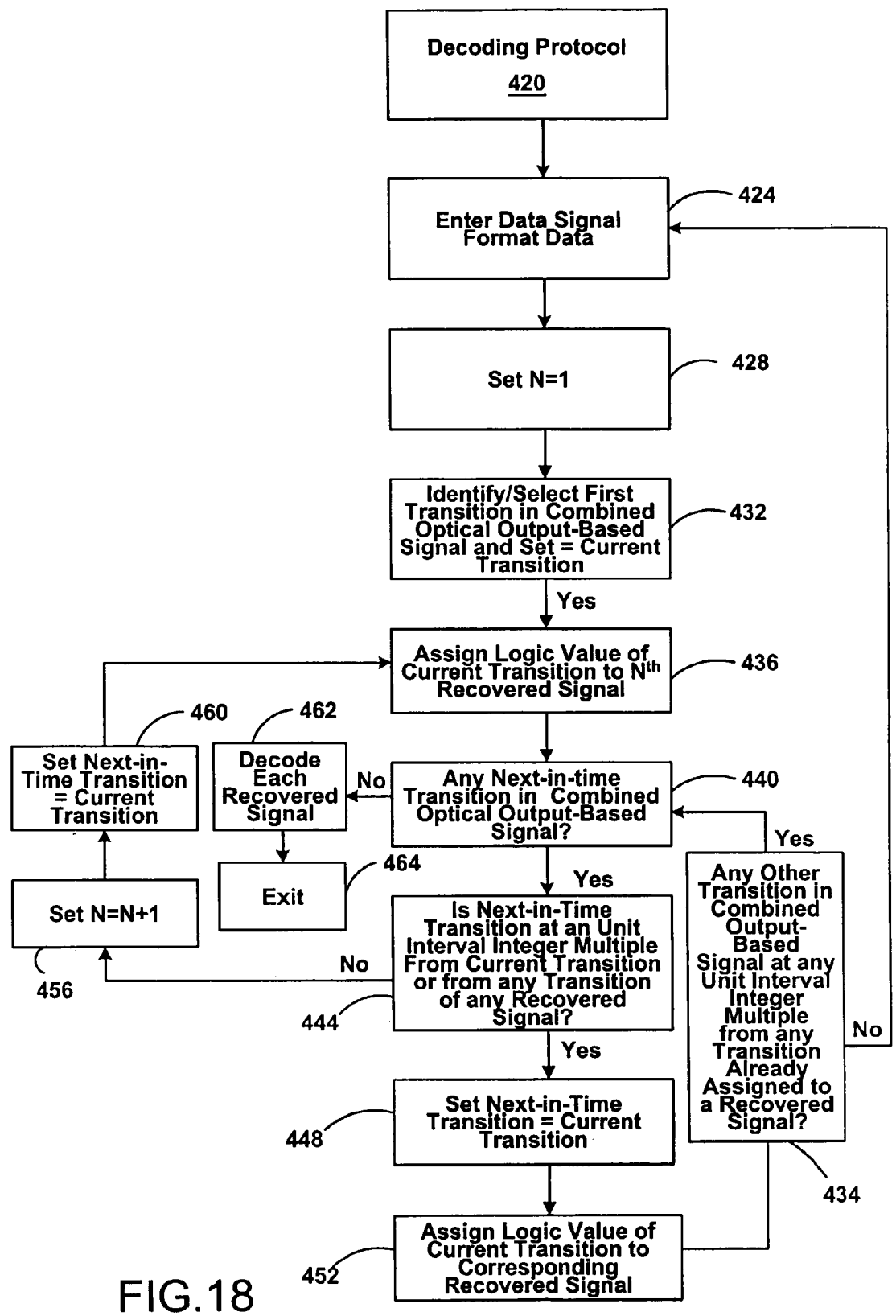
FIG. 18 illustrates another embodiment of an optical emanations decoding protocol that may be utilized by the decoder of the data processing system of FIG. 12 to address the type of cumulative optical output-based trace or waveform of FIG. 16.

The optical emanations decoding protocol 380 of FIG. 17 includes a number of preliminary steps that may be executed in any order. Data signal format data is entered at step 384 of the protocol 380. This data will include at least the number of bits per byte and the unit interval. The protocol 380 could be configured to require other data, such as the logic value for the start bits and stop bits. The discussion of the decoding protocol 380 will continue in relation to start bits having a logic level of 0 and stop bits having a logic level of 1. Step 388 of the protocol 380 sets a counter "N" equal to 1.

The decoding protocol 380 of FIG. 17 initiates the decoding analysis at a step 392 by identifying or selecting an unassigned transition in the optical output-based signal, and setting this transition equal to a base transition for convenience in referencing the same later in the protocol 380. "Unassigned" means that a given transition has not previously been associated with an individual optical signal (e.g., it has not been associated with one of the optical waveforms 376 of FIG. 16). "Transition" again means that the combined optical output-based signal goes from a logic level 0 to a logic level 1 or vice versa. Typically step 392 will be done by scanning the combined optical output-based signal in a forward-in-time basis (e.g., from left to right).

The decoding protocol 380 of FIG. 17 proceeds from step 392 to step 396 where the combined optical output-based signal is scanned to determine if there are any other transitions in the combined optical output-based signal at a certain time after the base transition associated with step 392. That is, if the unit interval information that was entered in step 384 was correct, the scanning of the combined optical output-based signal should identify additional transitions in the signal, and these subsequent-in-time should occur at integer multiples of the unit interval from the base transition associated with step 392. Consider the case where the unit interval from step 384 is 104.2 microseconds (corresponding with a data transmission rate of 9,600 bits per second), and assumed that the base transition of step 392 corresponds with a time $t_0$. The first unit interval integer multiple will then be $t_1$ (104.2 microseconds after $t_0$), the second unit interval integer multiple will then be $t_2$ (104.2 microseconds after $t_1$), the third unit interval integer multiple will then be $t_3$ (104.2 microseconds after $t_2$), and so forth. If these additional transitions do exist at the correct times (i.e., at any unit interval integer multiple from the time of the base transition associated with step 392), the decoding protocol 380 proceeds from step 396 to step 400. At step 400, the logic level or value of the base transition and at each unit interval integer multiple from the base transition (e.g., 1 unit interval after the time of the base transition, 2 unit intervals after the time of the base transition, 3 unit intervals after the time of the base transition, and so forth) is determined/identified and also assigned to its own individual optical signal (the first time through the loop defined by steps 392, 396, and 400 being the first recovered optical signal). This signal may be decoded at step 404 of the protocol, for instance using the decoding protocol of FIG. 14B. The counter "N" is then set equal to N+1 at step 408 (e.g., such that the next signal that is recovered will be the second recovered signal, the next will be the third recovered signal, and so forth). Steps 404 and 408 may be executed in any order. In any case, step 412 of the decoding protocol 380 makes a determination as to whether there are any other unassigned transitions in the combined optical output-based signal. If all of the individual optical signals have then recovered, the protocol 380 exits at step 416. Otherwise, the protocol returns from step 412 to step 392 for repetition in accordance with the foregoing.

The foregoing again applies if the unit interval information that is entered at step 384 is correct. If incorrect unit interval information was entered at step 384, step 396 of the decoding protocol 380 should not identify any transitions in the combined optical output-based signal that occur at integer multiples of the unit interval (step 384) from the base transition (step 392). In this case, the decoding protocol 380 proceeds from step 396 back to step 384 where a different unit interval may be entered for repetition in accordance with the foregoing.

It should be appreciated that the decoding protocol 380 of FIG. 17 will require multiple passes or scans of the combined optical output-based signal in order to identify and recover/retrieve each of the individual optical signals. One embodiment of a decoding protocol that may not require multiple passes through the combined optical output-based signal is presented in FIG. 18 in the form of an optical emanations decoding protocol 420. The decoding protocol 420 of FIG. 18 includes a number of preliminary steps that may be executed in any order. Data signal format data is entered at step 424 of the protocol 420. This data will include at least the number of bits per byte and the unit interval. The protocol 420 could be configured to require other data, such as the logic value for the start bits and stop bits. The discussion of the decoding protocol 380 will continue in relation to start bits having a logic level of 0 and stop bits having a logic level of 1. Step 428 of the protocol 420 sets a counter "N" equal to 1.

The decoding protocol 420 further includes a step 432 where a first transition in the combined optical output-based signal is identified, and setting this equal to a current transition for ease of reference later in the protocol 420. Typically this will be the earliest transition in the combined optical output-based signal, although such need not necessarily be the case. The logic value or level of this current transition is assigned to its own individual optical signal at step 436 of the protocol 420. The protocol 420 proceeds to a step 440 where a determination is made as to whether there are any next-in-time transitions in the combined optical output-based signal. If there are none, the decoding protocol 420 exits by proceeding from step 440 to a step 462 where the various individual optical signals that have been recovered may be decoded, for instance using the decoding protocol 288 of FIG. 14B, and then to step 464 where the protocol 420 exits. Otherwise, the decoding protocol 420 proceeds from step 440 to step 444.

Step 444 of the decoding protocol 420 determines whether the next-in-time transition is at a unit interval integer multiple from the current transition or from any transition of any recovered signal. If such is the case, the decoding protocol 420 proceeds from step 444 to step 448 where this next-in-time transition is set equal to the current transition, and then to a step 452 where the logic value of the current transition is assigned to the corresponding recovered signal. The protocol 420 further includes a step 434. Generally, this step 434 makes a determination as to whether the correct unit interval information was entered at step 424. Step 434 may include the corresponding logic from the protocol 288 of FIG. 14B. That is, the step 434 will be configured such that continued forward-in-time scanning of the combined optical output-based signal will only continue for a limited time if none of the transitions occur at unit interval integer multiples form a prior-in-time transition. It should be appreciated that steps 452 and 434 may be executed in any order. In any case, the decoding protocol 420 returns to step 440 for repetition in accordance with the foregoing.

Step 440 of the decoding protocol again makes a determination as to whether the next-in-time transition is a unit interval integer multiple from the current transition or from any transition of any recovered signal. If such is not the case, the decoding protocol 420 proceeds from step 444 to step 456. Here, the counter "N" is set equal to N+1, the next-in-time transition is set equal to the current transition at step 460, and the decoding protocol 420 returns to step 436. Steps 456 and 416 may be executed in any order.

It should be appreciated that the decoding protocol 420 at least attempts to scan the combined optical output-based signal a single time and yet identify and recover each of the various individual optical signals. However, in the event that the unit interval information entered in step 424 is incorrect, multiple scans of the combined optical output-based signal will still be required.

The above-noted embodiments involve an information processing device that has an optical device that is modulated in accordance with a data signal that is being received by and/or transmitted from the information processing device (a compromising optical emanations optical device). Certain types of information processing devices do not utilize such an optical device, but still nonetheless have some type of optical device for providing a different function (a non-comprising optical emanations optical device). In at least certain instances, these types of information processing devices may be modified in some manner such that a non-compromising optical emanations optical device of the information processing device is in effect converted to a compromising optical emanations optical device. That is, the "converted" optical device is modulated in accordance with a data signal that is being received by and/or transmitted from the information processing device so that its optical output may be monitored to retrieve the data that is embedded within the data signal.

Figure 19:
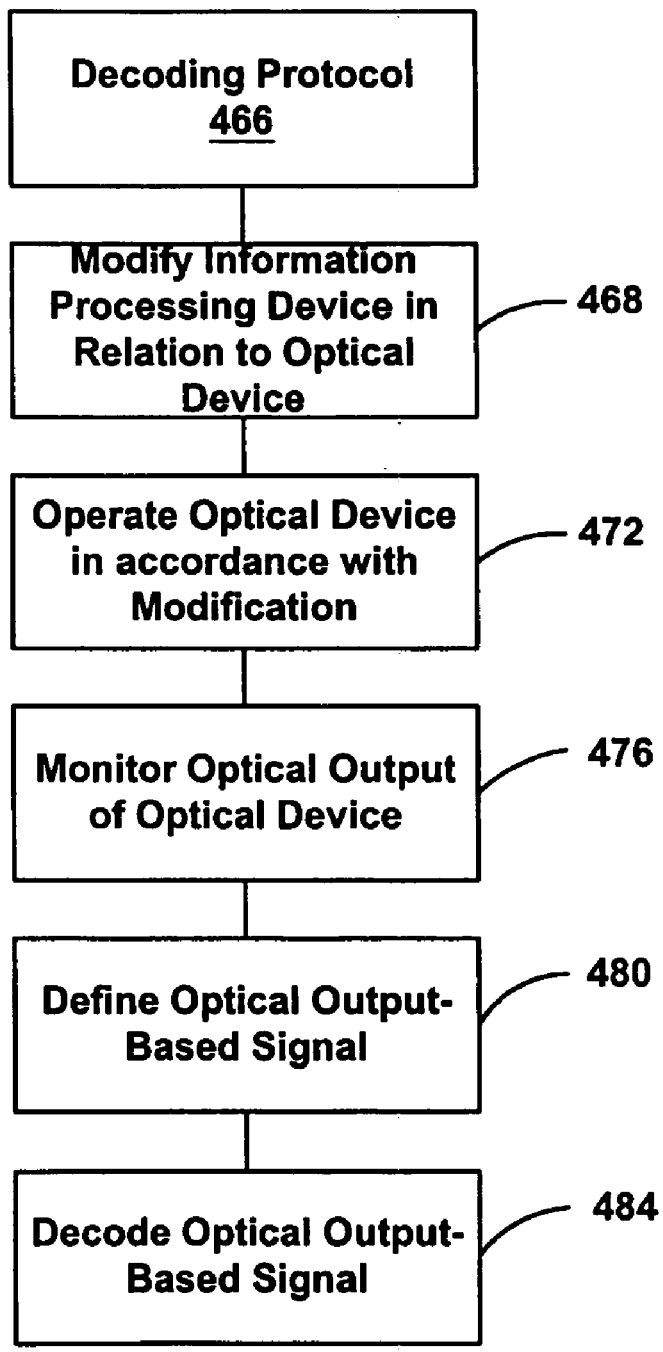
FIG. 19 illustrates another embodiment of an optical emanations decoding protocol, where a modification is made to an information processing device to at least one optical device of this information processing device so that it generates an optical output that replicates a data signal being received by or transmitted from the information processing device.

One embodiment of a protocol that is directed to the conversion of a non-compromising optical emanations optical device into a compromising optical emanations device is illustrated in FIG. 19. The decoding protocol 466 of FIG. 19 initiates with a step 468 where the information processing device is modified in accordance with the above. That is, at least some type of modification is made in relation to the information processing device such that what was originally a non-compromising optical emanations device is converted to a compromising optical emanations optical device. Thereafter, the now compromising optical emanations optical device is operated in accordance with this modification through execution of step 472 of the protocol 466. The optical output of the now compromising optical emanations optical device may be monitored through execution of step 476. An optical output-based signal may be defined from this monitoring through execution of step 480. Thereafter, data may be retrieved from the optical output-based signal through execution of step 484. Step 484 may be executed in any appropriate manner, including by utilizing the decoding protocol 288 of FIG. 14B, the decoding protocol 380 of FIG. 17, or the decoding protocol 420 of FIG. 18.

The decoding protocol 466 of FIG. 19 may utilize any number of optical devices that are commonly associated with an information processing device and which, until modified in accordance with the decoding protocol 466, do not emit compromising optical emanations. For instance, such an optical device may be on a PC keyboard. Typical PC keyboards have a light emitting diode (LED) associated with each of the Caps Lock key, the Num Lock key, and the Scroll Lock key. These LEDs are not directly connected to their associated keys, but instead are controlled by software. The PC keyboard is an intelligent device that communicates with the host computer over a bi-directional, synchronously clocked serial interface at approximately 10,000 bits per second. Therefore, a PC keyboard would be an example of the type of information processing device that may be the subject of the decoding protocol 466 of FIG. 19.

The capacity of the keyboard interface channel far exceeds the requirements of even the fastest typist. So long as the amount of data sent to the keyboard is limited, and does not interfere with the processing of keystrokes, the excess bandwidth can be profitably employed by a software program to control the operation of one or more of these LEDs in a manner that replicates the data being transmitted by the keyboard or any other data desired to be transmitted. That is, a software program may be installed on a computer for and configured to modulate one or more of these LEDs in accordance with the data being transmitted by the keyboard. This software program could be loaded in any manner, including by including such a software program in a virus or a "Trojan horse." Therefore, the addition of this type of a software program may be one type of modification that may be employed by the decoding protocol 466 of FIG. 19.

One embodiment of the above-noted type of software program is included at the end of this Detailed Description under the heading "Computer Program Listing." This software program transmits ASCII data by modulating the Caps Lock LED with serial data at 50 bits per second.

Figure 20:
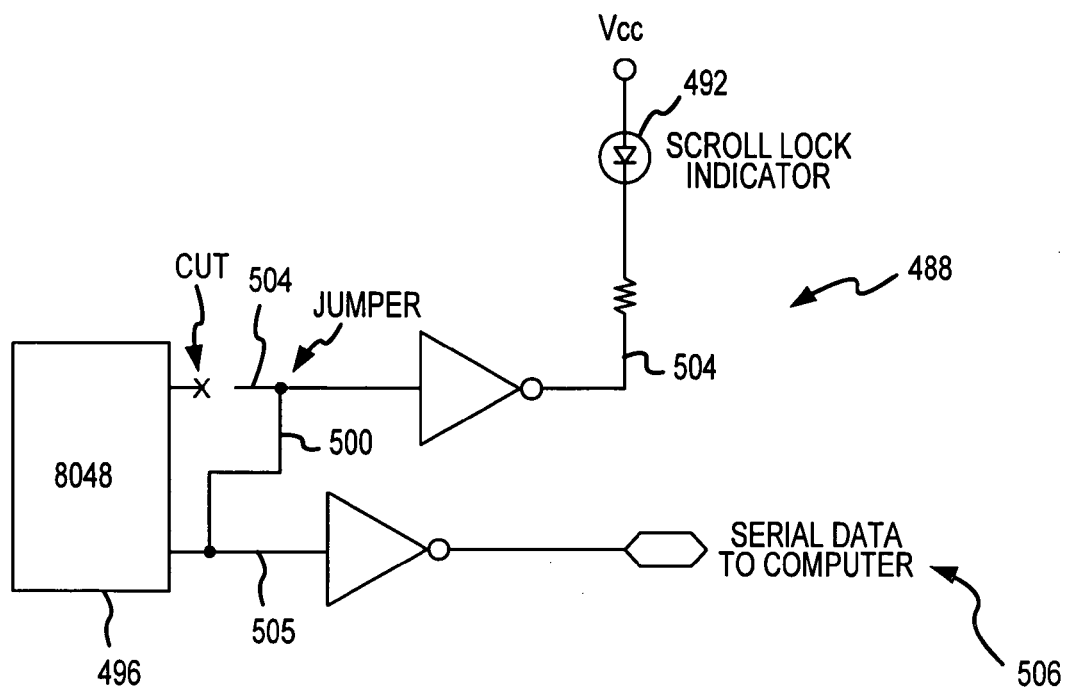
FIG. 20 is one embodiment of a system that embodies one type of modification that is utilized by the decoding protocol of FIG. 19.
Figure 21:
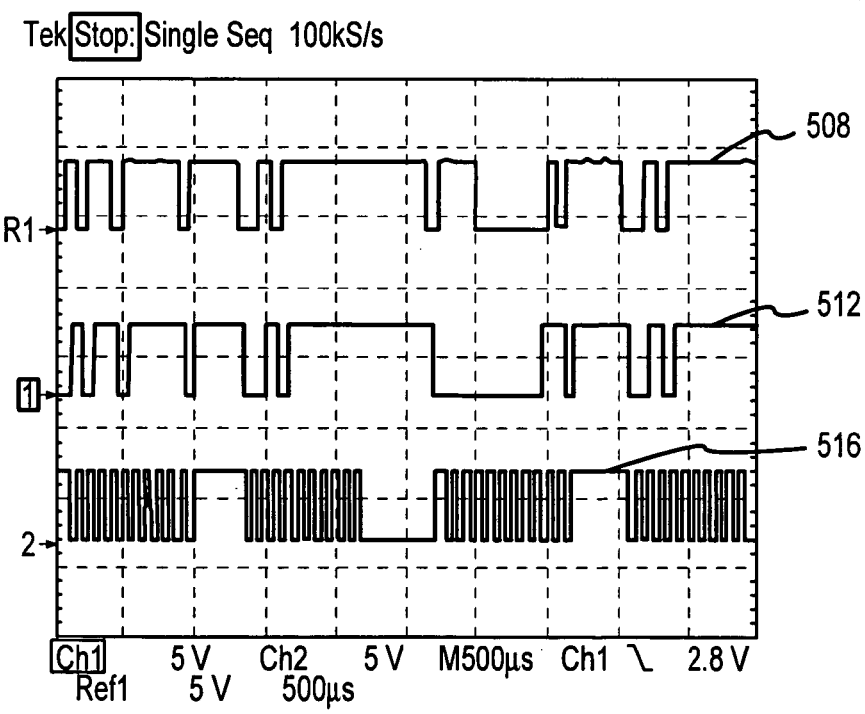
FIG. 21 presents an optical output trace or waveform that is generated by the system of FIG. 20 in its modified form, as well as electrical traces or waveforms on a keyboard data interface and keyboard data clock that may be used by the system of FIG. 20.

Another option for the modification of step 468 from the protocol of FIG. 19 is to change the hardware of the information processing device. FIG. 20 illustrates one type of hardware modification that may be employed for a PC keyboard to change its operation in accordance with the decoding protocol 466 of FIG. 19. The PC keyboard 488 of FIG. 20 includes a scroll lock indicator 492 that is typically interconnected with a processor 496 by a line 504. The keyboard 488 is operatively interconnected with a host computer 506 by a line 505. The modification to the keyboard 488 in accordance with step 468 of the decoding protocol 466 of FIG. 19 is the provision of an open circuit in the line 504 between the scroll lock indicator 492 and the processor 496, along with the addition of a jumper 500 between the lines 504 and 505. Although this prevents normal operation of the scroll lock indicator 492, this function is not often utilized. Moreover, although this results in the optical output of the scroll lock indicator 492 replicating the data being transmitted by the keyboard 488, the flickering of the scroll lock indicator 492 was found to be not especially noticeable. In this case, the optical output of the scroll lock indicator 492 may be modulated directly by a 10,000 bits per second serial data stream in the keyboard line 505 to the host computer 506. Again, the data in the serial data stream may then be recovered by monitoring the optical output of the scroll lock indicator 492 and then decoding the same in any of the various manners described herein. In this regard, the output of the scroll lock indicator 492 used by the keyboard 488 of FIG. 20 is presented in FIG. 21 in the form of an optical waveform 508. The electrical signal on the keyboard data interface is represented by a waveform 512 in FIG. 21, while the electrical signal on the keyboard data clock is represented by a waveform 516 in FIG. 21.

The bandwidth that is made available by the hardware modification of FIG. 20 is greater than that which may be achieved by the above-noted type of software modification. However, the information is in the form of keyboard scan codes, not ASCII. It requires a bit of translation on the receiving end, but also yields more information. Since accurate timing of both key-down and key-up events are reported, this technique may provide enough information to compromise identity verification systems based on typing characteristics or the generation of cryptographic keys.

Other options for the modification of step 468 of the decoding protocol 466 of FIG. 19 include adding an infrared (IR) emitter to the optical device in the information processing device. For instance, in the case of a PC keyboard, an IR chip may be co-encapsulated with a visible LED in the same package. If the two LEDs were connected back-to-back internally, only two leads would be required, and the IR LED would be indistinguishable from a standard component except under high magnification. Some modification to the keyboard controller circuitry may need to be made to utilize the IR capabilities of the new IR LED. Further modifications are possible that may be made to enhance one or more aspects of the decoding protocol 466 of FIG. 19 when adding an IR emitter to output the desired optical emanations that are reflective of the data being transmitted by the keyboard. These include: 1) increasing the drive current to the IR LED for increasing the range at which its optical emissions may be collected for decoding; 2) using one or more channel encoding techniques to reduce transmission errors and to support higher speeds; 3) using a timer and buffer memory to allow for a delay in sending until the keyboard has been idle for a while; 4) using encryption and compression of the covert channel data; 5) using sender identification to support having multiple information processing devices modified in this manner in a single location; 6) using code division multiple access to support having multiple information processing devices modified in this manner in a single location; 7) using a pattern matching capability, to look for specific information in the keyboard data stream; and 8) preserving the normal functionality of the visible LED indicator.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

COMPUTER PROGRAM LISTING

```c
/*
// sl.c -- a covert channel using the Caps Lock LED.
//
// For Solaris 2.x on SPARC; compile with $ {CC} sl.c -1posix4
*/
#include <fcntl.h>
#include <stdio.h>
#include <stdlib.h>
#include <sys/kbio.h>
#include <sys/kbd.h>
#include <time.h>
#include <unistd.h>
#define SPEED 50 /* data transmission speed (bits per second) */
void set_led (int fd, char *data);
void time_led (int fd, char *data);
void perror_exit (char *function_name);
/* set up a 20 millisecond intersymbol delay */
struct timespec min, max = {0, 1000000000 / SPEED };
int
main (void)
{
    char message[] = "My credit card number is 1234 5678 910 1112.";
    char restore_data;
    char *p = &message[0];
    int fd;
    /* open the keyboard device */
    if ((fd = open ("/dev/kbd", O_RDONLY))<0)
        perror_exit ("open");
    /* save the state of the keyboard LEDs */
    if (ioctl (fd, KIOCGLED, &restore_data)<0)
        perror_exit ("ioctl");
    while (*p) {
        char data = LED_CAPS_LOCK;
        int i;
        /* start bit is a "1"*/
        time_led (fd, &data);
        /* send 8 bits, least significant first */
        for(i = 0; i< 8; i++) {
            data=*p>>i & 1 ? LED_CAPS_LOCK : 0;
            time_led (fd, &data);
        }
        /* stop bit is a "0"*/
        data = 0;
        time_led (fd, &data);
            /* next character of message */
            p++;
    }
    /* restore state of the keyboard LEDs */
    set_led (fd, &restore_data);
    return (close (fd));
}
/* turn keyboard LEDs on or off*/
void
set_led (int fd, char *data)
{
    if (ioctl (fd, KIOCSLED, data)<0)
        perror_exit ("ioctl");
}
/* transmit one bit */
void
time_led (int fd, char *data)
{
    set_led (fd, data);
    nanosleep (&min, &max);
}
/* display an error message and quit */
void
perror_exit (char *function_name)
{
    perror (function_name);
    exit (1);
}
```

What is claimed is:

1. A method for operating a first optical device that is associated with an information processing device, comprising the steps of:
   providing a first data signal to said information processing device, wherein said first optical device displays the state of said first data signal crossing an interface associated with said information processing device; and
   operating said first optical device other than in accordance with said first data signal by changing said first data signal to generate a second signal, wherein said second signal comprises a plurality of bit transitions.

2. A method, as claimed in claim 1, further comprising the step of:
   directing said first data signal toward said first optical device, wherein said changing step comprises blocking or attenuating said first data signal before reaching said first optical device.

3. A method, as claimed in claim 2, wherein:
   there is a first electrical path to said first optical device, wherein said blocking step is selected from the group consisting of opening a switch that is disposed in said electrical path, removing a jumper that is disposed in said electrical path, controlling an operation of an AND-gate that is disposed in said electrical path, and any combination thereof.

4. A method, as claimed in claim 1, further comprising the step of:
   directing said first data signal toward said first optical device, wherein said operating step comprises the steps of:
   providing said second signal to said first optical device; and
   operating said first optical device in accordance with said second signal, wherein said changing step comprises the step of removing at least some data from said first data signal to form said second signal.

5. A method, as claimed in claim 4, wherein:
   said changing step comprises using an OR-gate to output said second signal in a form of a continuous logic level that maintains said first optical device in a continually on condition.

6. A method, as claimed in claim 1, further comprising the step of:
   directing said first data signal toward said first optical device, wherein said operating step comprises the step of filtering said first data signal to define said second signal that is provided to said first optical device.

7. A method, as claimed in claim 6, wherein:
   said filtering step comprises using a low-pass filter.

8. A method, as claimed in claim 6, wherein:
   said filtering step comprises configuring said second signal such that a time duration for any bit in said second signal is at least 1.5 greater than a time duration of any bit in said first data signal.

9. A method, as claimed in claim 6, wherein:
   said filtering step comprises configuring said second signal such that a time duration for any bit in said second signal is at least 2.0 greater than a time duration for any bit in said first data signal.

10. A method, as claimed in claim 6, wherein:
    said filtering step comprises requiring a minimum on time for said first optical device that is at least 1.5 times greater than a unit interval of at least one of a current data rate or a slowest data rate associated with said first data signal.

11. A method, as claimed in claim 6, wherein:
    said filtering step comprises requiring a minimum off time for said first optical device that is at least 1.5 times greater than a unit interval of at least one of a current data rate or a slowest data rate associated with said first data signal.

12. A method, as claimed in claim 6, wherein:
    said filtering step comprises requiring a minimum on time for said first optical device that is at least 1.5 times greater than a unit interval of at least one of a current data rate or a slowest data rate associated with said first data signal; and
    said filtering step further comprises requiring a minimum off time for said first optical device that is at least 1.5 times greater than said unit interval of at least one of said current data rate or said slowest data rate associated with said first data signal.

13. A method, as claimed in claim 1, further comprising the step of:
    directing said first data signal toward said first optical device, wherein said operating step comprises the step of changing said first data signal to said second signal such that a time duration for any bit in said second signal is at least 1.5 times greater than a time duration for any bit in said first data signal.

14. A method, as claimed in claim 1, further comprising the step of:
    directing said first data signal toward said first optical device, wherein said operating step comprises the step of changing said first data signal to said second signal such that a minimum time duration for any bit in said second signal is at least 2.0 times greater than a time duration for any bit in said first data signal.

15. A method, as claimed in claim 1, further comprising the step of:
    directing said first data signal toward said first optical device, wherein said operating step comprises the step of changing said first data signal to said second signal such that a minimum on time for said first optical device is at least 1.5 times greater than a unit interval of at least one of a current data rate or a slowest data rate associated with said first data signal.

16. A method, as claimed in claim 1, further comprising the step of:
    directing said first data signal toward said first optical device, wherein said operating step comprises the step of changing said first data signal to said second signal such that a minimum off time for said first optical device is at least 1.5 times greater than a unit interval of at least one of a current data rate or a slowest data rate associated with said first data signal.

17. A method, as claimed in claim 1, further comprising the step of:
    directing said first data signal toward said first optical device, wherein said operating step comprises the step of changing said first data signal to said second signal such that a minimum on time for said first optical device that is at least 1.5 times greater than a unit interval of at least one of a current data rate or a slowest data rate associated with said first data signal, wherein said changing step further comprises requiring a minimum off time for said first optical device that is at least 1.5 times greater than a unit interval of at least one of a current data rate or a slowest data rate associated with said first data signal.

18. A method, as claimed in claim 1, further comprising the steps of:

directing said first data signal toward said first optical device, wherein said operating step comprises the step of changing said first data signal to said second signal such that a minimum on time for said first optical device is extended to at least a duration of one character in said first data signal of at least one of a current data rate or a slowest data rate associated with said first data signal.

19. A method, as claimed in claim 1, wherein:

said operating step comprises turning said first optical device on and off in a pattern that is not indicative of all data that is embedded in said first data signal, wherein said first optical device is selected from the group consisting of a light emitting diode, a liquid crystal display, an incandescent, fluorescent, or gas discharge lamp, an electroluminiscent display, and a cathode ray tube.

20. A method for operating a first optical device that is associated with an information processing device, comprising the steps of:

providing a first data signal to said information processing device, wherein said first optical device displays a state of said first data signal crossing an interface associated with said information processing device;

changing said first data signal to a second signal, wherein said changing step comprises removing at least some data from said first data signal to form said second signal;

providing said second signal to said first optical device; and operating said first optical device in accordance with said second signal.

21. A method, as claimed in claim 20, wherein:
said changing step comprises the step of filtering said first data signal to define said second signal.

22. A method, as claimed in claim 21, wherein:
said filtering step comprises using a low-pass filter.

23. A method, as claimed in claim 21, wherein:
said filtering step comprises configuring said second signal such that a time duration for any bit in said second signal is at least 1.5 times greater than a time duration for any bit in said first data signal.

24. A method, as claimed in claim 21, wherein:
said filtering step comprises configuring said second signal such that a time duration for any bit in said second signal is at least 2.0 times greater than a time duration for any bit in said first data signal.

25. A method, as claimed in claim 21, wherein:
said filtering step comprises requiring a minimum on time for said first optical device that is at least 1.5 times greater than a unit interval of at least one of a current data rate or a slowest data rate associated with said first data signal.

26. A method, as claimed in claim 21, wherein:
said filtering step comprises requiring a minimum off time for said first optical device that is at least 1.5 times greater than a unit interval of at least one of a current data rate or a slowest data rate associated with said first data signal.

27. A method, as claimed in claim 21, wherein:
said filtering step comprises requiring a minimum on time for said first optical device that is at least 1.5 times greater than a unit interval of at least one of a current data rate or a slowest data rate associated with said first data signal; and
said filtering step further comprises requiring a minimum off time for said first optical device that is at least 1.5 times greater than said unit interval of at least one of said current data rate or said slowest data rate associated with said first data signal.

28. A method, as claimed in claim 20, wherein:
said changing step comprises the step of changing said first data signal to said second signal such that a time duration for any bit in said second signal is at least 1.5 times greater than a time duration for any bit in said first data signal.

29. A method, as claimed in claim 20, wherein:
said changing step comprises the step of changing said first data signal to said second signal such that a time duration for any bit in said second signal is at least 1.5 times greater than a time duration for any bit in said first data signal.

30. A method, as claimed in claim 20, wherein:
said changing step comprises changing said first data signal to said second signal such that a minimum on time for said first optical device is at least 1.5 times greater than a unit interval of at least one of a current data rate or a slowest data rate associated with said first data signal.

31. A method, as claimed in claim 20, wherein:
said changing step comprises changing said first data signal to said second signal such that a minimum off time for said first optical device is at least 1.5 times greater than a unit interval of at least one of a current data rate or a slowest data rate associated with said first data signal.

32. A method, as claimed in claim 20, wherein:
said changing step comprises changing said first data signal to said second signal such that a minimum on time for said first optical device at least 1.5 times greater than a unit interval of at least one of a current data rate or a slowest data rate associated with said first data signal, and wherein said changing step further comprises requiring a minimum off time for said first optical device that is at least 1.5 times greater than a unit interval of at least one of said current data rate or said slowest data rate associated with said first data signal.

33. A method, as claimed in claim 20, wherein:
said operating step comprises turning said first optical device on and off in a pattern that is not indicative of all data that is embedded in said first data signal, wherein said first optical device is selected from the group consisting of a light emitting diode, a liquid crystal display, an incandescent, fluorescent, or gas discharge lamp, an electroluminiscent display, and a cathode ray tube.

34. A method for obtaining data from an information processing device, comprising the steps of:

providing a first data signal to said information processing device;

displaying a state of said first data signal crossing an interface associated with said information processing device using a first optical device that is associated with said information processing device;

monitoring an optical output of said first optical device;

generating an optical output-based signal from said monitoring step; and retrieving data from said optical output-based signal from said monitoring step using a computer.

35. A method, as claimed in claim 34, wherein:
said monitoring step comprises using telescopic optics.

36. A method, as claimed in claim 34, wherein:
said retrieving step comprises converting said optical output to an electrical signal and decoding said electrical signal.

37. A method, as claimed in claim 36, wherein:
said converting step comprises directing said optical output to a device selected from the group consisting of one or more photodetectors, photomultipliers, phototransistors, directly by an optical sensor, means for conveying said optical output of said first optical device to an optical sensor, or any combination thereof.

38. A method, as claimed in claim 36, wherein:
said decoding step comprises providing said electrical signal to a universal synchronous-asynchronous receiver-transmitter.

39. A method, as claimed in claim 34, wherein:
said retrieving step comprises analyzing said optical output-based signal to identify at least one of a first start bit and a first stop bit of a first data signal that is at least substantially replicated by said optical output.

40. A method, as claimed in claim 39, wherein:
said retrieving step further comprises identifying a unit interval used by said first data signal based upon an identification of at least one of said first start bit and said first stop bit, wherein said unit interval is defined as a time that is used to transmit one bit of information in said first data signal.

41. A method, as claimed in claim 39, wherein:
said start bit is a 0 and said stop bit is a 1.

42. A method, as claimed in claim 39, wherein:
said first data signal is binary, wherein a start bit of said first data signal is always a first value and a stop bit of said first data signal is always a second value that is different from said first value, wherein said analyzing step further comprises:
executing a first identifying step comprising identifying an occurrence of a change from said second value to said first value and setting this equal to a current start bit candidate;
executing a second identifying step after an identification of said current start bit candidate by said executing a first identifying step and comprising the steps of:
  identifying a smallest pulse width after said current start bit candidate that corresponds from a change from one of said first and second values to the other of said first and second values; and
  setting said smallest pulse width as a current unit interval;
decoding said first data signal if said first data signal has one said stop bit a predetermined number of said unit intervals after said current start bit candidate using said current unit interval; and
repeating said executing a first and second identifying steps if said first data signal does not have one said stop bit said predetermined number of said unit intervals after said current start bit candidate using said current unit interval.

43. A method, as claimed in claim 42, wherein:
said predetermined number of said unit intervals is selected from the group consisting of 7 or 8.

44. A method, as claimed in claim 34, wherein:
said optical output-based signal is indicative of a first data signal that comprises a plurality of bytes, wherein each said byte is preceded by a start bit and is immediately followed by a stop bit, wherein each said start bit is of a first magnitude and each said stop bit is of a second magnitude that is different from said first magnitude, wherein said retrieving step comprises the steps of:
reviewing said optical output-based signal;
selecting a current start bit candidate from said reviewing step;
identifying a smallest pulse width after said selecting step that corresponds from a change from one of said first and second values to the other of said first and second values;
setting said smallest pulse width equal to a current unit interval;
decoding said first data signal if said first data signal has one said stop bit a predetermined number of said unit intervals after said current start bit candidate; and
repeating said reviewing, selecting, identifying, setting and decoding steps if said optical output-based signal does not have one said stop bit said predetermined number of said unit intervals after said current start bit candidate.

45. A method, as claimed in claim 44, wherein:
said decoding step comprises using a universal synchronous-asynchronous receiver-transmitter.

46. A method, as claimed in claim 44, further comprising the steps of:
modifying a configuration associated with said information processing device so that said optical output of said first optical device is indicative of said first data signal being transmitted to said information processing device.

47. A method, as claimed in claim 46, wherein:
said modifying step comprises changing software used by said information processing device.

48. A method, as claimed in claim 46, wherein:
said modifying step comprises changing hardware used by said information processing device.

49. A method for operating a first optical device that is associated with an information processing device, comprising the steps of:
providing a first data signal to said information processing device, wherein said first optical device displays the state of said first data signal crossing an interface associated with said information processing device;
operating said first optical device other than in accordance with said first data signal; and
directing said first data signal toward said first optical device, wherein said operating step comprises the step of filtering said first data signal to define a second signal that is provided to said first optical device, wherein said filtering step comprises configuring said second signal such that a time duration for any bit in said second signal is at least 1.5 greater than a time duration of any bit in said first data signal.

50. A method for operating a first optical device that is associated with an information processing device, comprising the steps of:
providing a first data signal to said information processing device, wherein said first optical device displays the state of said first data signal crossing an interface associated with said information processing device;
operating said first optical device other than in accordance with said first data signal; and directing said first data signal toward said first optical device, wherein said operating step comprises the steps of:

changing said first data signal to a second signal, wherein said changing step comprises removing at least some data from said first data signal to form said second signal;

providing said second signal to said first optical device; and operating said first optical device in accordance with said second signal.

* * * * *

UNITED STATES PATENT AND TRADEMARK OFFICE
CERTIFICATE OF CORRECTION

PATENT NO. : 6,987,461 B2
DATED : January 17, 2006
INVENTOR(S) : Loughry

It is certified that error appears in the above-identified patent and that said Letters Patent is hereby corrected as shown below:

Column 31,
Line 3, delete "elcctrical" and insert -- electrical --.

Signed and Sealed this

Eleventh Day of April, 2006

JON W. DUDAS
*Director of the United States Patent and Trademark Office*